(12) United States Patent
Ma

(10) Patent No.: US 8,025,071 B2
(45) Date of Patent: Sep. 27, 2011

(54) BASES AND BRACES FOR SUPPORT POLES, SUCH AS POLES FOR PAVILIONS AND UMBRELLAS

(76) Inventor: Oliver Joen-an Ma, Arcadia, CA (US)

( * ) Notice: Subject to any disclaimer, the term of this patent is extended or adjusted under 35 U.S.C. 154(b) by 0 days.

(21) Appl. No.: 12/633,705

(22) Filed: Dec. 8, 2009

(65) Prior Publication Data
US 2010/0147344 A1   Jun. 17, 2010

Related U.S. Application Data

(63) Continuation of application No. 11/241,892, filed on Sep. 30, 2005, now Pat. No. 7,628,164.

(30) Foreign Application Priority Data

Sep. 30, 2004   (CN) ..................... 2004 2 0090728 U

(51) Int. Cl.
*E04H 15/34* (2006.01)
*E04H 15/46* (2006.01)

(52) U.S. Cl. ..... 135/140; 135/122; 135/144; 135/120.3; 248/354.3; 403/403

(58) Field of Classification Search .................. 135/121, 135/122, 87, 139–140, 143–144, 152, 120.3; 52/635, 8, 646, 83, 652.1; 248/354.1, 354.3–354.5; 403/231, 403
See application file for complete search history.

(56) References Cited

U.S. PATENT DOCUMENTS

| 325,302 A | 9/1885 | Wilson |
|---|---|---|
| 1,026,845 A | 5/1912 | Bishop |
| 1,093,482 A | 4/1914 | Scheuerman |
| 1,222,140 A | 4/1917 | Robinson |
| 1,257,097 A | 2/1918 | Morris |
| 1,360,421 A | 11/1920 | Lloyd |
| 1,583,039 A | 5/1926 | Wickstrum |
| 2,181,702 A | 11/1939 | Masoner |
| 2,584,283 A | 2/1952 | Oliver et al. |
| 2,661,752 A | 12/1953 | Kampf et al. |
| 2,850,027 A | 9/1958 | Smith |
| 2,856,644 A | 10/1958 | Dunham |
| 2,905,284 A | 9/1959 | Hinze |
| 2,914,816 A | 12/1959 | Lundgren |
| 3,030,061 A | 4/1962 | Jennings |
| 3,044,477 A | 7/1962 | Higgins |
| 3,212,512 A | 10/1965 | Morris |
| 3,263,692 A | 8/1966 | Questi et al. |
| 3,326,225 A | 6/1967 | Banks |
| 3,333,595 A | 8/1967 | Bannister et al. |
| 3,353,852 A | 11/1967 | Wood |
| 3,362,117 A | 1/1968 | Van Rader |

(Continued)

*Primary Examiner* — Winnie Yip
(74) *Attorney, Agent, or Firm* — Knobbe, Martens, Olson & Bear LLP

(57) ABSTRACT

Bases are disclosed that comprise a projecting portion designed to receive over it the hollow end of a pole or other elongate member, which may form part of a structure such as a pavilion or umbrella. The projecting portion of the base comprises wedges that move in response to the end of the pole moving over the projecting portion and in so moving, the wedges increase the effective cross section of the projecting portion to engage the inner surface of the end of the pole and to thereby stabilize the structure on a support surface, such as the ground. Braces are also disclosed that pull together adjacent poles of a pavilion to make the structure more rigid.

15 Claims, 17 Drawing Sheets

U.S. PATENT DOCUMENTS

| | | |
|---|---|---|
| 3,528,691 A | 9/1970 | Matich |
| 3,606,222 A | 9/1971 | Howard |
| 3,729,877 A | 5/1973 | Hall |
| 3,805,468 A | 4/1974 | Grantstrom |
| 3,810,481 A | 5/1974 | Nohmura |
| 3,879,774 A | 4/1975 | Glasser et al. |
| 4,038,803 A | 8/1977 | Schoeller |
| 4,066,089 A | 1/1978 | Rainwater |
| 4,134,703 A | 1/1979 | Hinners |
| 4,161,131 A | 7/1979 | Blayman |
| 4,279,104 A | 7/1981 | Classen |
| 4,320,608 A | 3/1982 | Deike |
| 4,766,712 A | 8/1988 | Hale |
| 4,824,303 A | 4/1989 | Dinger |
| 5,000,211 A | 3/1991 | Speare et al. |
| 5,125,206 A * | 6/1992 | Motohashi et al. .............. 52/646 |
| 5,186,570 A | 2/1993 | Graf |
| 5,193,327 A | 3/1993 | Goodenberger |
| 5,197,349 A | 3/1993 | Herman |
| 5,232,304 A | 8/1993 | Huang |
| 5,274,980 A | 1/1994 | Zeigler |
| 5,277,405 A | 1/1994 | McSwain |
| 5,345,962 A | 9/1994 | Moss |
| 5,524,854 A * | 6/1996 | McSwain et al. .......... 248/354.1 |
| 5,634,482 A | 6/1997 | Maritin |
| 5,702,196 A | 12/1997 | Peteresak |
| 5,740,822 A | 4/1998 | Einck |
| 5,797,411 A | 8/1998 | Parker |
| 5,839,214 A * | 11/1998 | Peterson ...................... 38/102.4 |
| 5,897,268 A | 4/1999 | Deville |
| 5,906,077 A | 5/1999 | Andiarena |
| 6,089,247 A | 7/2000 | Price |
| 6,202,371 B1 | 3/2001 | Natelli, Jr. |
| 6,203,239 B1 | 3/2001 | Mucciaccciaro et al. |
| 6,223,482 B1 | 5/2001 | Zuhar |
| 6,230,448 B1 | 5/2001 | Oliver et al. |
| 6,243,996 B1 | 6/2001 | Oliver et al. |
| 6,250,320 B1 | 6/2001 | Roth |
| 6,282,861 B1 | 9/2001 | Natelli, Jr. |
| 6,439,251 B2 | 8/2002 | Carter |
| 6,446,411 B2 | 9/2002 | Natelli, Jr. |
| 6,612,320 B2 | 9/2003 | Lin et al. |
| 6,643,982 B1 | 11/2003 | Lapp, Jr. et al. |
| 6,687,130 B2 | 2/2004 | Adams, Sr. et al. |
| 6,698,440 B2 | 3/2004 | Beyer et al. |
| 6,722,381 B2 | 4/2004 | Lai |
| 6,763,633 B2 | 7/2004 | Cote |
| 6,779,538 B2 | 8/2004 | Morgante et al. |
| 6,848,459 B2 | 2/2005 | Ma |
| 7,350,532 B2 | 4/2008 | Wu |
| 7,380,563 B2 | 6/2008 | Seo |
| 7,703,464 B2 | 4/2010 | Ma |

* cited by examiner

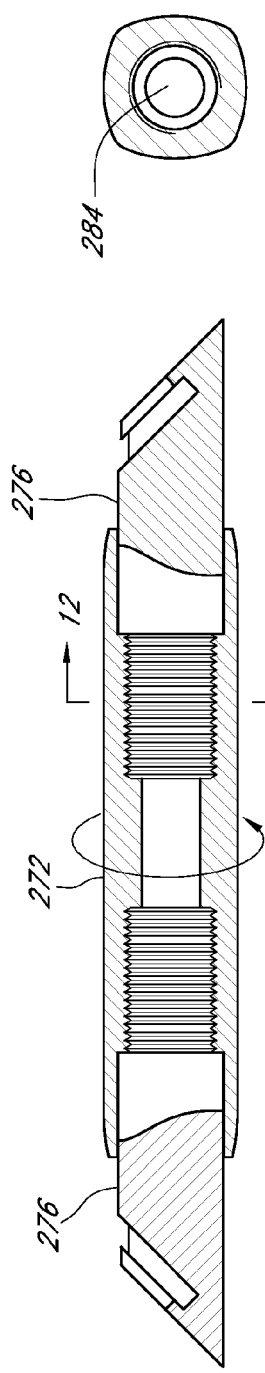
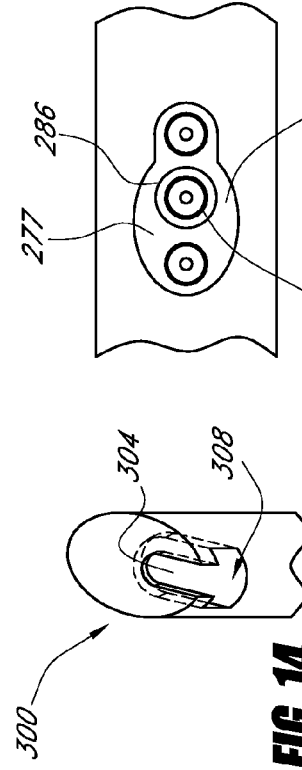
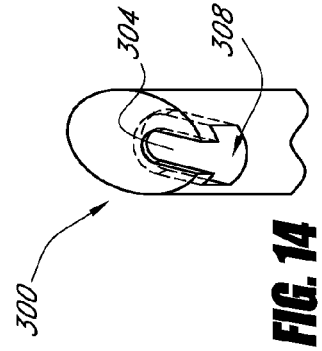
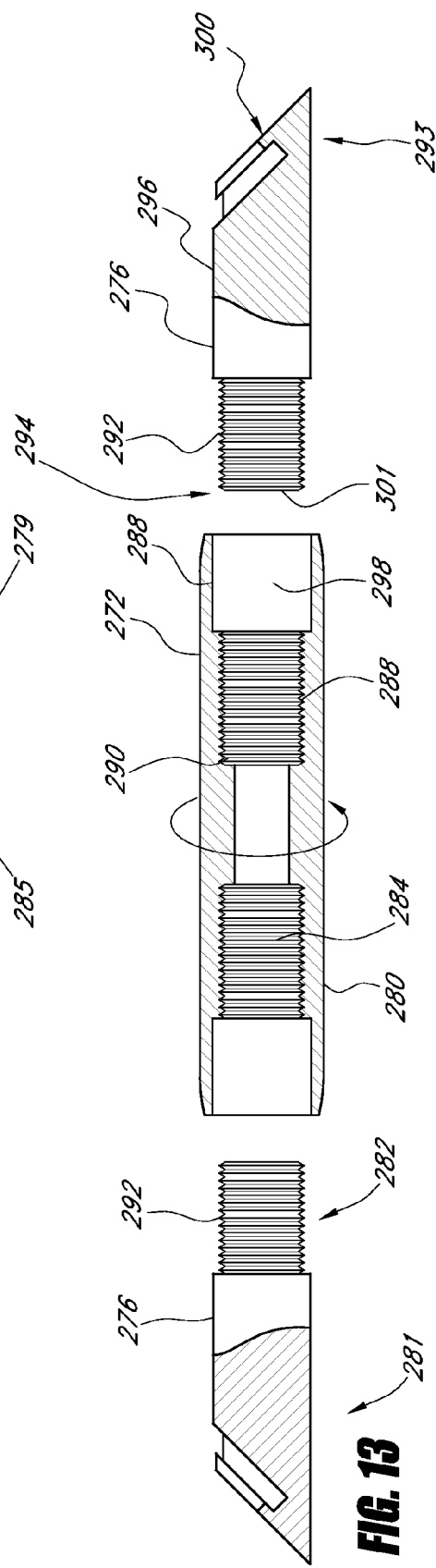

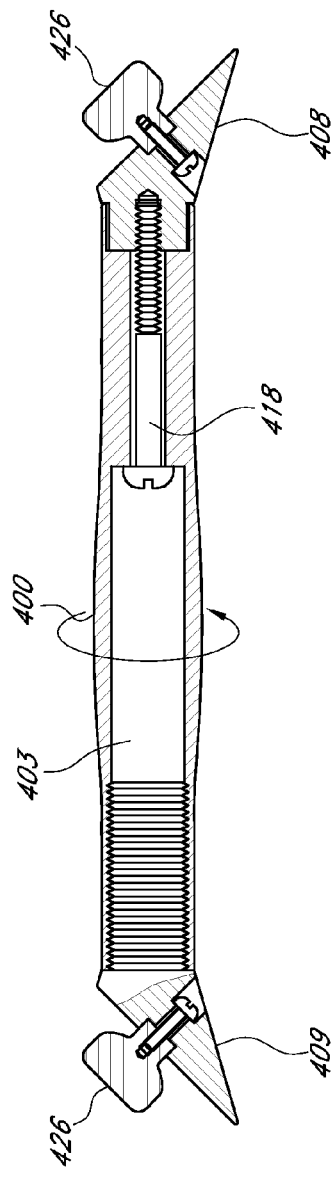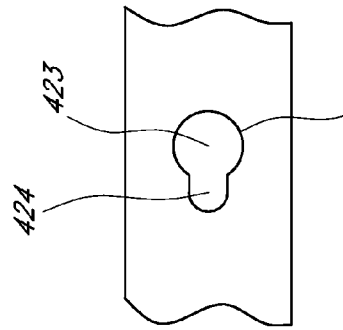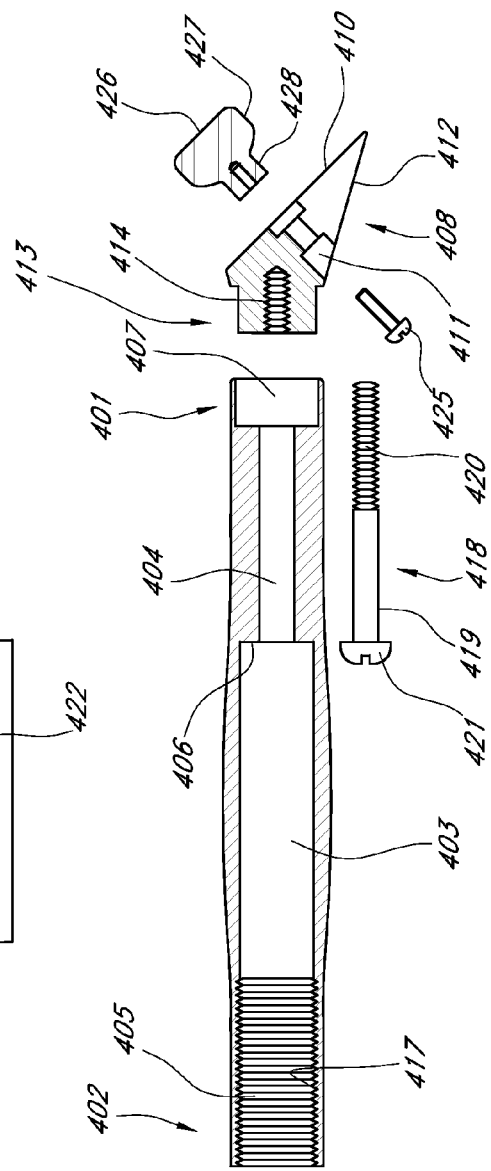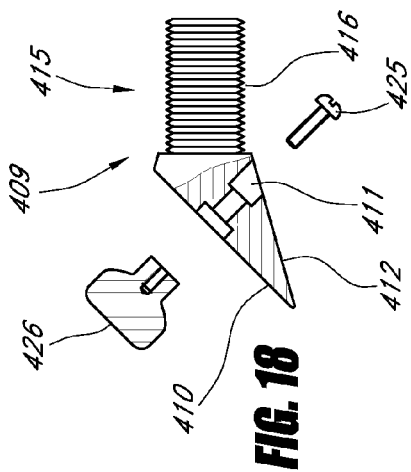
FIG. 17
FIG. 19
FIG. 18

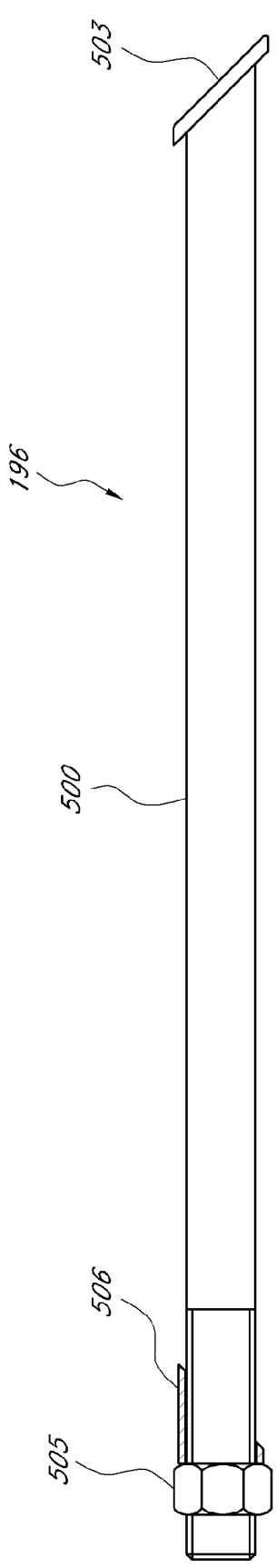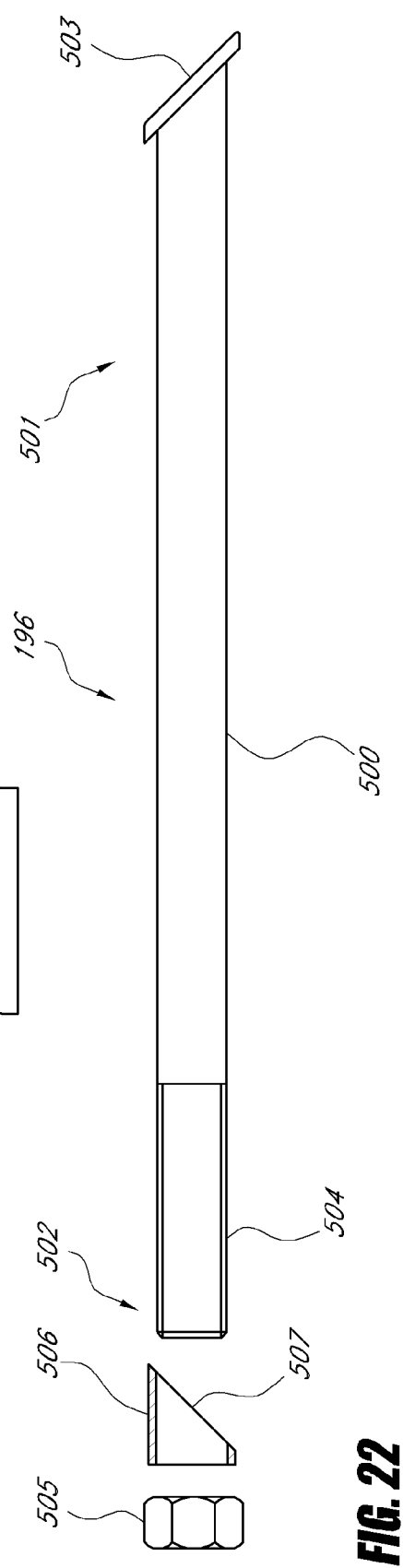

BASES AND BRACES FOR SUPPORT POLES, SUCH AS POLES FOR PAVILIONS AND UMBRELLAS

RELATED APPLICATIONS

The present application is a continuation of U.S. patent application Ser. No. 11/241,892, filed Sep. 30, 2005, which claims the priority benefit under 35 U.S.C. §119(a)-(d) to Chinese Application No. 200420090728, filed Sep. 30, 2004, the disclosures of which are incorporated by reference herein in their entirety.

BACKGROUND OF THE INVENTION

1. Field of the Invention

This application is concerned with wedge mechanisms and bases incorporating them for connecting poles, posts and the like to the ground, and sheltering structures, such as pavilions, incorporating such bases. This application is also concerned with braces for pavilions and similar shade structures.

2. Description of the Related Art

Shade or sheltering structures, such as pavilions and umbrellas, are well known. Pavilions typically comprise four or more support poles supporting a corresponding number of poles that extend from the top of the support poles to a common, central junction. A fabric or synthetic sheet covering extends over these poles and partially or completely over the support poles and the spaces between them to form a tent-like structure. Umbrellas typically comprise a single, upright support pole having at its top, or suspended from a transversely mounted suspending pole, a rib structure carrying a canopy.

All such structures depend upon a secure and firm base at the bottom of the support poles to connect the structure to a support surface, usually the ground. This is particularly important for large pavilions and patio or market umbrellas.

Also, since such structures are often temporary or movable, they need a convenient, preferably quick connecting base for ease of use.

In addition, pavilions are large and unwieldy structures that can be troublesome to erect or dismantle and need to resist wind and other forces applied to them. In another embodiment of this invention braces are provided that are convenient to install and remove and contribute to an improved rigid structure.

SUMMARY OF THE INVENTION

Bases are disclosed that comprise a projecting portion designed to receive over it the hollow end of a pole or other elongate member, which may form part of a structure such as a pavilion or umbrella. The projecting portion of the base comprises wedges that move in response to the end of the pole moving over the projecting portion and in so moving, the wedges increase the effective cross section of the projecting portion to engage the inner surface of the end of the pole and to thereby stabilize the structure on a support surface, such as the ground. Braces are also disclosed that pull together adjacent poles of a pavilion to make the structure more rigid.

This invention provides in one embodiment a base for a hollow support member, the base comprising a base plate extending in a first plane and a wedge guide, extending along an axis substantially perpendicular to the first plane and being fixed with respect to the base plate. A plurality of inclined surfaces are formed on the wedge guide and are inclined, so that the cross section of the wedge guide increases in a direction towards the base plate. The base further comprises a plurality of wedges, corresponding in number to the inclined surfaces, the wedges each having a similarly inclined surface contacting a respective inclined surface of the wedge guide and movable along said wedge guide surface. The wedges have an external profile, which is preferably substantially parallel to said axis, the profile increasing in cross sectional area as the wedges move with respect to the wedge guide towards the base plate.

Another base according to the invention is for connecting a hollow tubular member to a support surface by means of frictional engagement with an inner surface of the tubular member. The base comprises a base plate configured to engage the support surface; at least one wedge guide member extending upwardly from the base plate along an axis generally perpendicular to said base plate, the wedge guide member having at least one surface inclined relative to said axis; and at least one wedge member, being slidable on the inclined surfaces of the wedge guide members(s) towards the base plate. Such sliding movement of the wedge(s) relative to the wedge guide member(s) increases the combined effective cross-sectional area of the wedge guide member(s) and wedge member(s) transverse to the axis of said base, to provide, in use, engagement with the inner surface of said tubular member.

Preferably, the base further comprises a member between the base plate and the wedge member(s) biasing the wedge member(s) away from the plate. The biasing member is preferably substantially uncompressed prior to relative movement between the wedge member(s) and wedge guide member(s) and compressed after relative movement between the wedge member(s) and wedge guide member(s) that increases the combined effective cross-sectional area of the wedge guide member(s) and wedge member(s). Suitable biasing members comprise helical springs.

In a preferred embodiment, the base further comprises a locking mechanism whereby a wedge member with which the biasing member is coupled can be retained in a position at which the biasing member is compressed. A locking mechanism may be provided that engages the tubular member to temporarily fix the relative positions of the base and tubular member, or otherwise connect them together. Preferably, the locking mechanism comprises a button extending from the base member, preferably the wedge guide, which can act against a portion of the tubular member, or extend into a recess or hole in the tubular member, to maintain the position of the tubular member relative to the wedge guide member. The button is preferably biased away from the wedge guide, such as by a spring.

The bases of this invention may comprise at least one flange or other projection, extending outwardly from at least one of the wedge members sufficiently to be contacted, in use, by the tubular member when it is advanced over the base, so as to move the wedge member(s) relative to the wedge guide member(s).

The bases of this invention may comprise various combinations of wedge guide members and wedge members. Preferably, the base comprises one wedge guide member and two wedge members. More preferably, the combined cross section of the wedge guide member and the wedge member is generally L-shaped. However, the cross section or outer profile of the wedge guide and wedges may be adapted to substantially any shape, especially one dictated by the interior of a pole that is intended to fit over them in accordance with this invention. Thus, the cross section or profile may be substantially circular, square, rectangular, triangular or a polygon. While manufacturing convenience and cost may dictate relatively simple structures, it is generally preferred that the outer profile of the wedge guide and its wedges are such as to maximize the contact with the inside of the pole that is to fit over them. Thus, preferably about 50%, more preferably about 75% and most preferably substantially all of the inner surface of the relevant pole provides the potential for contact with engagement surfaces on the wedges or of the wedges and the wedge guide or projection.

The wedge guide member may be offset or centrally located, with respect to the wedge members. For example, the wedge guide member may be centrally located with 2, 3, 4 or more wedge members around it.

One embodiment of the invention provides a base comprising an upwardly projecting portion for receiving a hollow portion of pole to support the pole or the ground or a similar support surface, the projecting portion comprising at least one wedge guide member extending along an axis, the wedge guide member having at least one surface inclined relative to said axis, the wedge guide further having a groove located on the inclined surface(s); and at least one wedge, being slidable on the inclined surface(s) of the wedge guide member(s), each wedge further comprising a protrusion that mates with the groove(s) on the wedge guide member(s) to substantially limit the relative movement of each wedge relative to each wedge guide member to be along the groove(s).

Preferably, the base further comprises a base plate attached to the projecting portion, the portion having an upper surface and the inclined surface(s) sloping away from the axis in a direction from adjacent the upper surface towards the base plate.

A further embodiment of the invention provides a wedge mechanism comprising a wedge guide member having an axis with a plurality of surfaces inclined relative thereto, a first wedge member and a second wedge member, the first wedge member being moveable in a first plane along one of the inclined surfaces, the second wedge member being movable in a second plane along one of the inclined surfaces, the second plane being substantially perpendicular to the first plane, wherein relative movement in one direction between the wedge guide member and the first and second wedges increases the combined effective cross-sectional area transverse to the vertical axis of the wedge mechanism and relative movement in the opposite direction decreases the cross-sectional area.

Preferably, the mechanism further comprises a base plate to which the wedge guide member is attached.

In the mechanism of the invention each inclined surface of the wedge guide member preferably has a groove therein extending in a direction of said inclination and each wedge member has a projection for engaging a groove in a corresponding inclined surface restricting movement each wedge member to along said groove.

A biasing member can be provided, acting on each wedge member to bias the wedge member(s) in said opposite direction.

The grooves and projections that link together the wedge guides and wedges or wedge members in this invention may be any suitable length or shape that permits the wedges to slide as needed. Preferably they extend along the entire length of the inclined surfaces of the wedge guide and wedges. The grooves may be in the wedge guide or wedges, with the corresponding projection being on the wedges or wedge guide, respectively. The projection may be a longitudinal rib. The shape of the grooves and projections are preferably such as to prevent them from easily separating, especially in the direction generally perpendicular to the inclined surfaces. Preferably, they are locked together in that direction. Preferably, for convenience of maintenance and manufacture, they may be separated by sliding the projection out of one end of the relevant groove. Preferably, the shape of the projection is substantially "T"-shaped in cross section, with the groove having a similar cross section.

The invention also provides pavilions or umbrellas incorporating the bases or wedge mechanisms described herein.

Thus, another embodiment of the invention provides a pavilion comprising a frame comprising a plurality of tubular support poles, each pole having an upper end, a lower end, and a mounting surface adjacent the lower end and an overhead assembly configured to be coupled to the tubular support poles, the overhead assembly configured to support a canopy fabric. The pavilion further comprises at least one base configured to be coupled with any of the support poles to provide stability for the pavilion when assembled and on the ground, the base comprising a first wedge member and a second wedge member, each of the first and second wedge members having an upper end and a lower end; and a wedge guide comprising a first inclined surface along which the first wedge member can move and a second inclined surface along which the second wedge member can move; and a perimeter defined around the wedge guide, the first wedge member, and the second wedge member; wherein the base has a first configuration wherein the first and second wedge members are at a first elevation and a second configuration wherein the first and second wedge members are at a second elevation, the second elevation being between the first elevation and the ground surface when in use, the length of the perimeter being greater when the base is in the second configuration than when the base is in the first configuration;

The pavilion frame can comprise from four to eight support poles configured to extend between the ground surface and the overhead assembly.

The overhead assembly preferably further comprises a plurality of transverse members that extend between each of the support poles; a plurality of inclined members, each inclined member having a lower end and an upper end; a plurality of corner unions, each corner union configured to couple support pole to at least one of a transverse member and an inclined member; and an upper union configured to couple the upper end of at least one of the inclined members to at least one other of the inclined members.

In some preferred embodiments of the pavilions of the invention, the base preferably comprises a biasing member biasing the first and second wedge members towards the first configuration. The invention has at least one of the first wedge member and second wedge member preferably comprises a flange that extends outward from the lower end thereof such that when a tubular support pole is advanced over the wedges, a bottom surface of the upright support pole contacts the flange to move the wedge members toward the second elevation.

The pavilion in this embodiment preferably comprises a locking mechanism whereby a wedge member can be held adjacent to the second elevation. The locking mechanism preferably comprises a button extending from the base that can act against a portion of a support pole to maintain the position of the support pole relative to the base.

The invention also provides a pavilion comprising the pavilion assembly described above and a canopy fabric configured to be coupled with an upper surface of the overhead assembly to provide shelter to a user. The pavilion assembly preferably comprises a pavilion frame that in use engages a mounting surface, the pavilion frame comprising a tubular support pole having a lower end, a wedge engagement portion, and an interior surface a wedge device comprising a base portion having an inclined surface configured to extend into the lower end of the tubular support pole adjacent the interior surface; and a wedge having a sliding surface configured to slide along the inclined surface and a flange configured to be engaged by the wedge engagement portion of the tubular support pole as the support pole is advanced over the wedge device.

The member may be configured to be engaged by the wedge engagement portion comprises a flange that extends away from the base portion.

The wedge engagement portion of the tubular support pole may comprise a bottom surface of the support pole.

The base portion may be configured with a plurality of inclined surfaces and a plurality of wedges, each wedge having a sliding surface configured to slide along each inclined surface of said base portion.

Preferably the base portion comprises an elongate groove and the wedge comprises a guide member configured to extend into the groove and to limit the movement of the wedge along the inclined surface. The guide member and the groove preferably limit the movement of the wedge to linear motion.

The invention also provides braces, particularly for shelter or shade structures, especially as described herein. Preferably, these structures are pavilions of the type described herein, especially pavilions comprising the bases of this invention. The braces typically connect together at least one upright elongate member or pole with at least one other elongate member or pole, which is transversely mounted with respect to the upright member, preferably in a substantially horizontal position when the pavilion is erected.

In a preferred embodiment, the braces of the invention comprise a generally elongate body having a longitudinal axis and located between connector elements, for attaching the brace at each end to the upright and horizontal members. The body comprises a handle portion that may be gripped and turned about the longitudinal axis by the hand. Preferably, the handle portion is attachable to the connector elements by screw threads formed on the connector elements and at the ends of the handle portion. In one embodiment, the threads are formed as male threads on the connector elements and female threads at the ends of the handle portion. Turning the handle portion rotates that portion over the threads on the connector elements, thereby shortening the brace. When the brace is in place attached to the upright and horizontal members of the pavilion, this shortening applies a force to those members, tending to pull the upright members and horizontal members together, thereby increasing rigidity of the structure.

One embodiment of the invention provides a brace having first and second ends and a longitudinal axis and comprising a first connector element for attaching the first end of the brace, directly or indirectly, to a member and a second connector element, for attaching the second end of the brace, directly or indirectly, to another member. The brace comprises a handle portion, located between the first and second connector element and being rotatable with respect to the connector elements about the longitudinal axis, the handle portion and connector elements extending generally along that axis. The first and second connector elements have outer walls and a surface for facing the members to which they are to be attached, respectively, and sloping with respect to the axis. The sloping surfaces each have a first slot extending from an outer wall along the sloping surface, and being open through the outer wall and along at least part of its length along the sloping surface, and a second slot extending generally parallel to the first and below it from the outer wall and being open to the outer wall and to the first slot along at least a part of the length of the first slot, the slots being for receiving attachment members attached directly or indirectly to the members that are to be braced. In use, rotation of the handle portion in one direction draws the connector portions together, and thereby also the members they brace, and rotation of the handle portion in the other direction allows the connector portions to move further apart.

Another embodiment of the invention provides a brace having first and second ends and a longitudinal axis and comprising a first connector element, for attaching the first end of the brace, directly or indirectly, to a member and a second connector element, for attaching the second end of the brace, directly or indirectly, to another member. The brace further comprises a handle portion, located between the first and second connector elements and being rotatable with respect to said connector elements about the longitudinal axis, the handle portion and connector elements extending generally along that axis. The first and second connector elements have a surface for facing the members to be braced and sloping with respect to the axis. The handle portion hays at least one open end communicating with an internal chamber extending along the axis, the chamber having a reduced cross section portion that provides an internal shoulder in a direction transverse to the axis. At least one bolt having a head at one end and a threaded portion at the other end is located in the chamber with the head engaging the shoulder, to limit movement of the bolt along the axis in the direction of the open end of the handle portion. The bolt extends through the open end of the handle portion and into a threaded cavity in the adjacent connector element. In use, when the handle portion is rotated in one direction the connector portions are drawn together, and thereby also the members to which the brace is attached, and rotation of the handle portion in the other direction allows the connector portions to move further apart.

Other embodiments of the invention provide pavilion assemblies comprising such braces. Preferably, the pavilions comprise a plurality of upright elongate members; and a plurality of elongate members arranged at an angle to the upright members, with at least one of the upright members being connected to at least one of the angled members by at least one brace.

BRIEF DESCRIPTION OF THE DRAWINGS

Some preferred embodiments of the invention will now be more particularly described by reference to the accompanying drawings in which:

FIG. 11 is a cross-sectional view of the corner support of the invention taken along a longitudinal axis.

FIG. 12 is a cross-sectional view of the corner support of FIG. 11 taken along section plane 12-12.

FIG. 13 is an exploded cross-sectional view of the corner support of FIG. 11 showing components parts.

FIG. 14 is a detail view of one end of one embodiment of the corner support of FIG. 11.

FIG. 15 is a detail view of a portion of a pavilion member with one embodiment of a mounting arrangement for the corner support of FIG. 11.

FIG. 17 is a cross-sectional view of the corner support of FIG. 16 taken along its longitudinal axis.

FIG. 18 is an exploded cross-sectional view of the corner support of FIG. 16, showing components parts.

FIG. 19 is a detail view of a portion of a pavilion member with one embodiment of a mounting arrangement for the corner support of FIG. 16.

FIG. 21 is a plan view of the corner support of FIG. 20.

FIG. 22 is a detail view of a portion of a pavilion member with one embodiment of a mounting arrangement for the corner support of FIG. 20.

FIG. 23 is an exploded, partial cross-sectional view of the corner support of FIG. 20.

DETAILED DESCRIPTION OF SOME EMBODIMENTS OF THE INVENTION

FIGS. 1-9 illustrate a sheltering structure or pavilion that includes bases according to the invention and comprises a supporting frame 100 and a cover 101. The cover 101, shown by dashed lines in FIG. 1, can be attached to the supporting frame 100 to provide shelter from the sun, rain, and the like. The cover 101 can be a conventional type used for umbrellas, pavilions, or other sheltering structures. Supporting components are provided to improve the sturdiness of the supporting frame 100. In one embodiment, the supporting frame 100 is reinforced by one or more bases 192, which will be described in more detail below. The bases 192 improve the connection between the supporting frame 100 and the surface to which it couples rests upon or otherwise engages. In another embodiment, the structural integrity of the supporting frame 100 is improved by one or more corner supports or braces 196 located between members of the supporting frame 100. In a further embodiment, the supporting frame 100 is reinforced by one or more bases 192 and one or more corner supports or braces 196. These corner supports or braces will also be described in more detail below.

Figure 1:
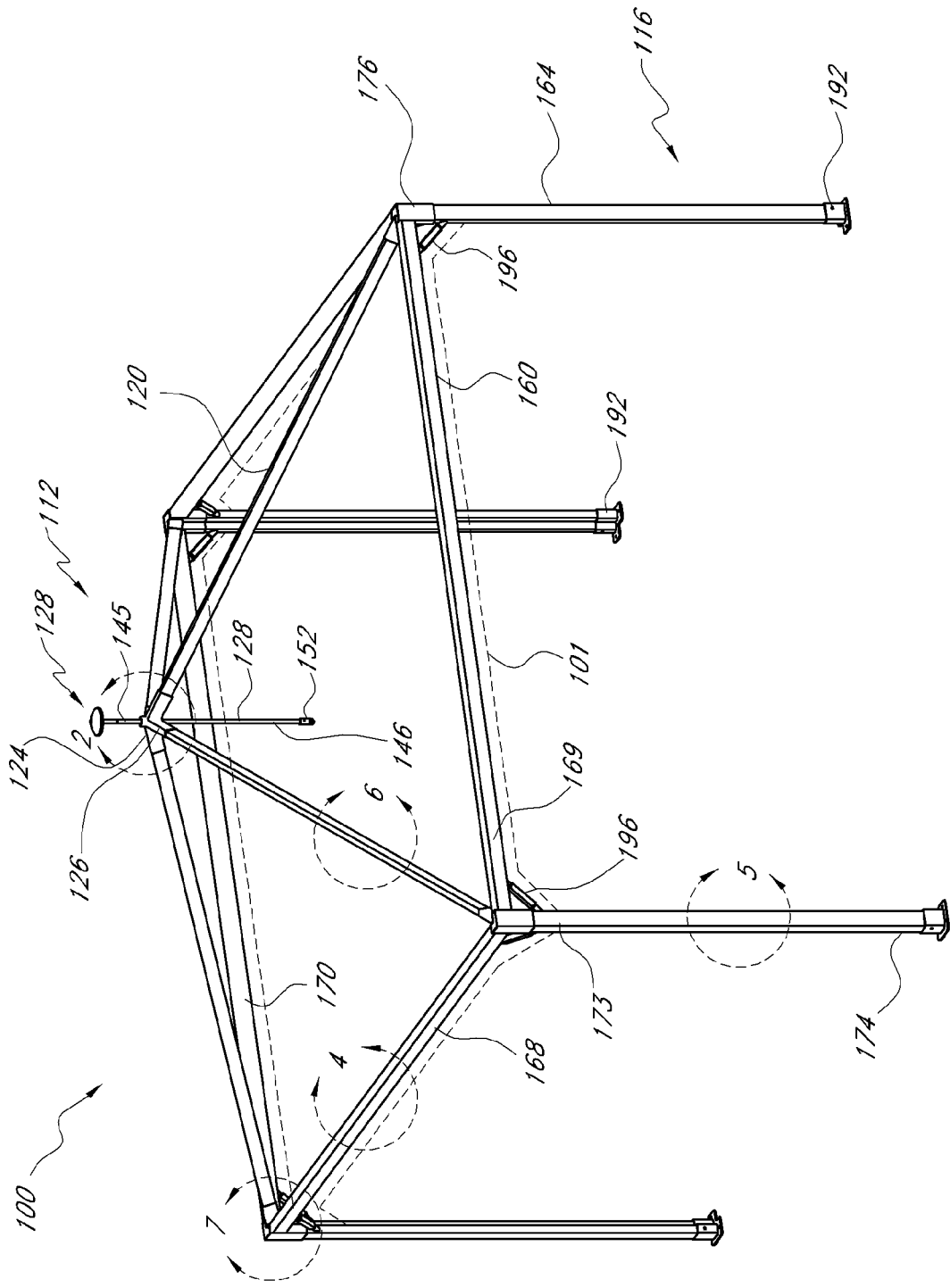
FIG. 1 is perspective view of a pavilion for incorporating the features of the invention and comprising a supporting frame capable of supporting a cover.

FIG. 1 shows that the supporting frame 100 comprises an upper frame 112 and a lower frame 116. The upper frame 112 preferably comprises a plurality of inclined elongate members or poles 120, an upper union 124 and a cover securement assembly 128. The upper frame 112 can be configured such that the inclined members 120 extend down from the upper union 124. The cover securement assembly 128 can be inserted through the center of and extend above and below the upper union 124. Preferably the cover securement assembly 128 contributes to attaching and securing the cover 101 to a portion of the upper frame 112.

Figure 6:
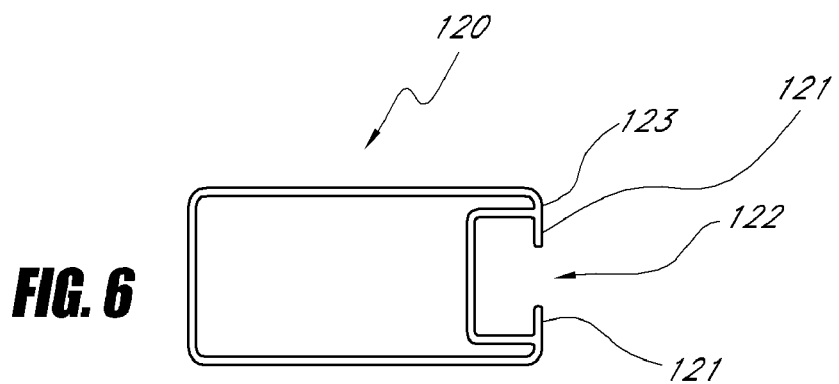
FIG. 6 is a cross-sectional view of an inclined member for the supporting frame of FIG. 1.
Figure 7:
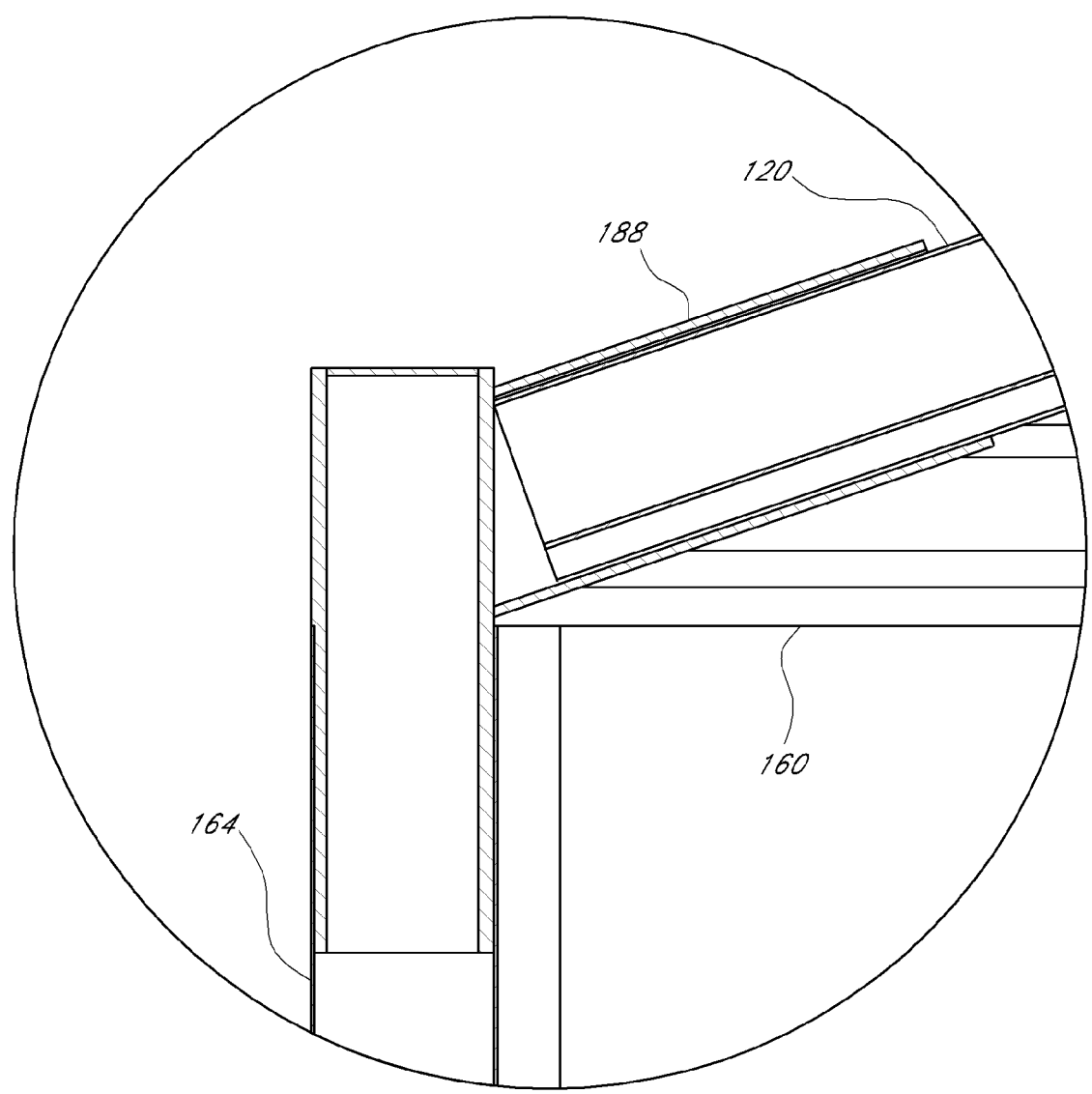
FIG. 7 is a partial cross-sectional view of a corner portion of the supporting frame of FIG. 1 taken along the section plane 7-7.
Figure 8:
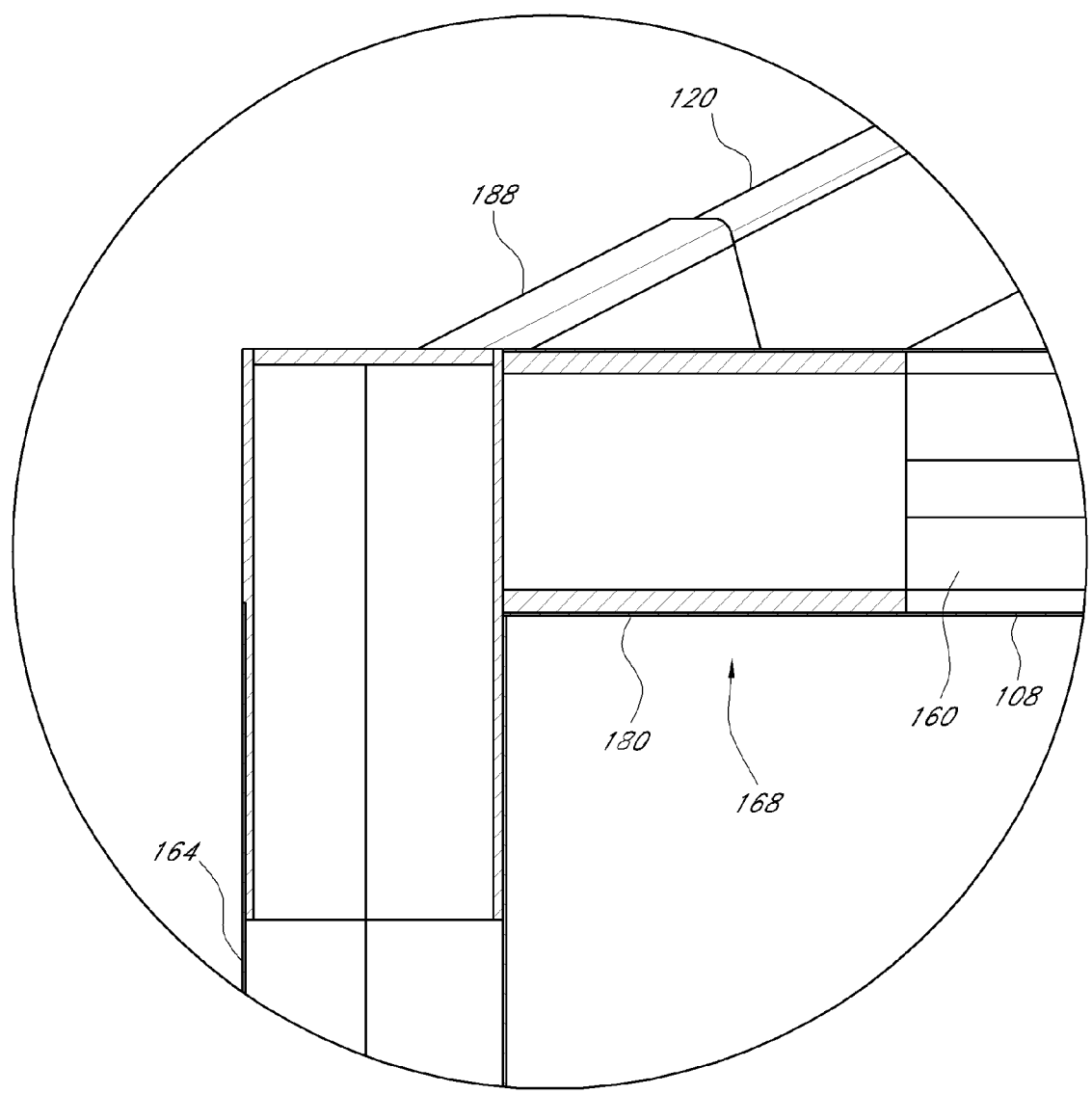
FIG. 8 is a partial cross-sectional view of a corner portion of the supporting frame of FIG. 1 taken along the section plane 8-8.
Figure 9:
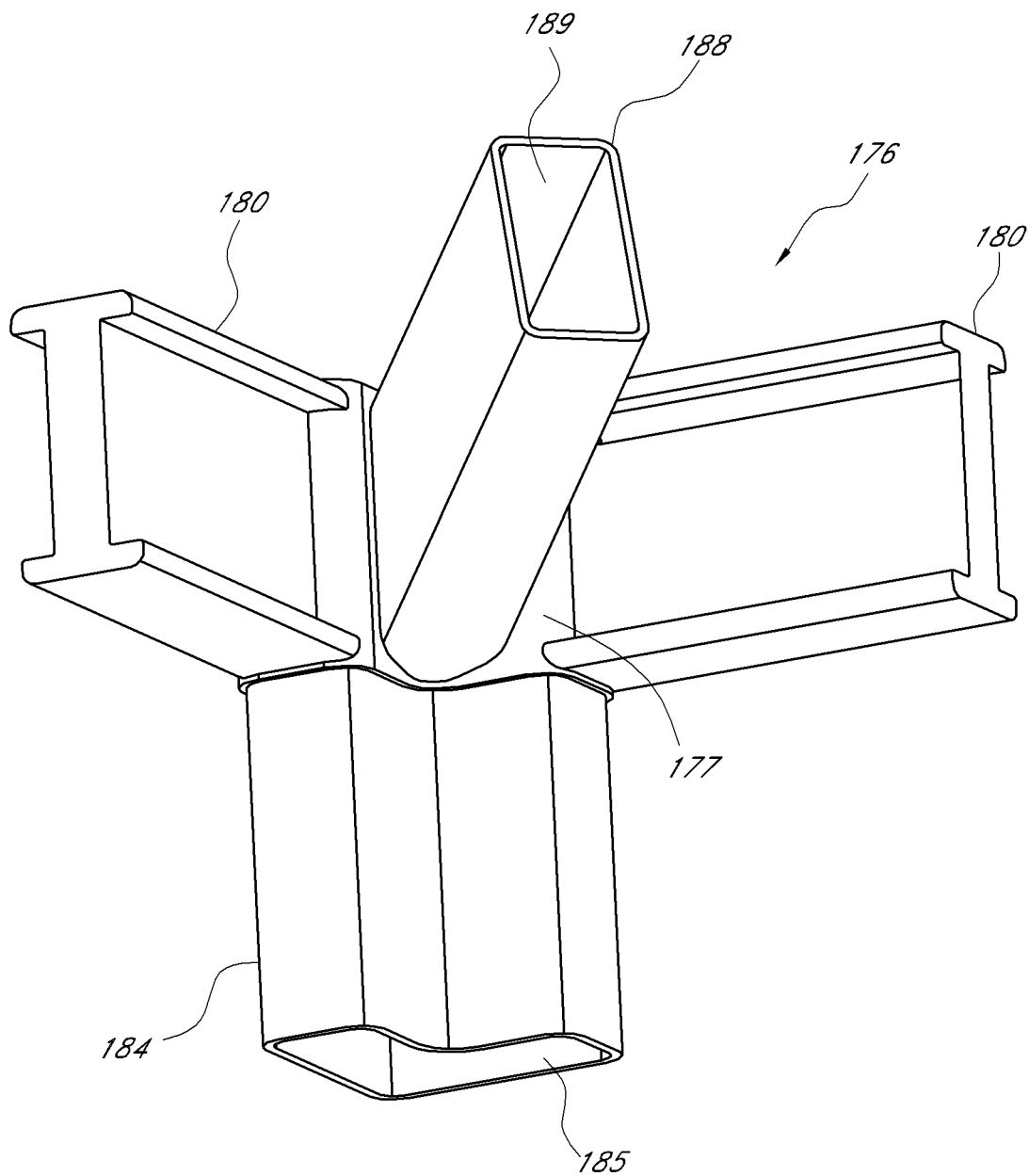
FIG. 9 is a perspective view of a corner union for the supporting frame of FIG. 1.

In FIG. 1 the inclined members 120 support the cover 101 at an elevation suitable for the purpose of the sheltering structure. In the pavilion shown, there are four tubular inclined members 120, each having a first, lower end 125 and a second, upper end 126. However, any suitable number can be used, typically from 3 to 8. The cross section of the first ends 125 of the inclined members 120 can be generally rectangular, although any cross section or perimeter, such as squire, hexagonal or other polygon can be used. Each inclined member 120 has a recessed channel 122 in a bottom surface 123. The channel 122 can be generally rectangular in shape and extend toward the top surface of each inclined member 120, as shown in FIG. 6. In one embodiment, the walls 121 of the inclined members 120 extend partially over the channel 122.

Figure 3:
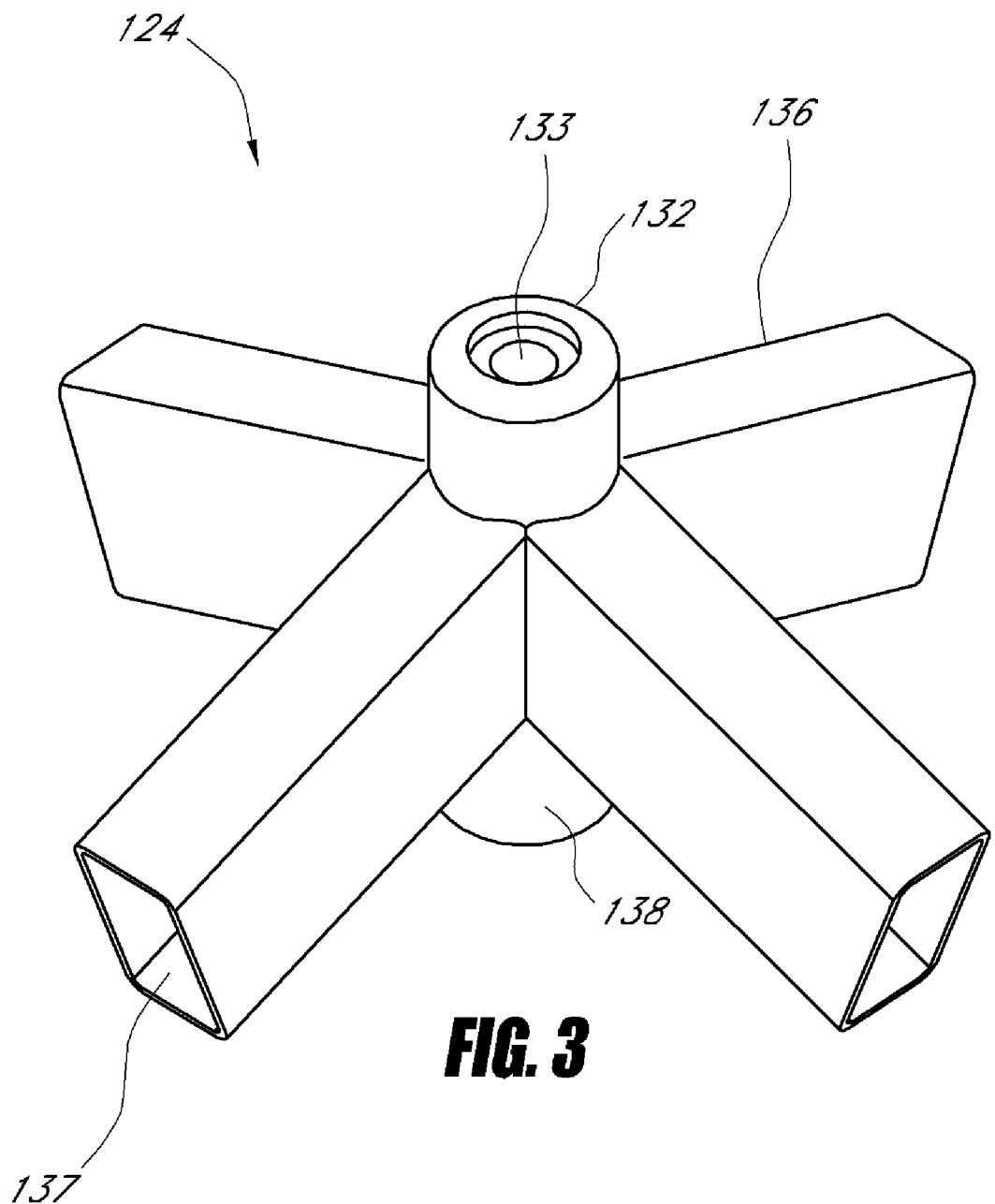
FIG. 3 is a perspective view of an upper union for the supporting frame of FIG. 1.

In one embodiment, the upper union 124 couples the second or upper ends 126 of the inclined members 120 to each other by inserting the second end 126 of each inclined member 120 into an inclined member receptacle 136. FIG. 3 shows that the upper union 124 can include a union center 132 and a plurality of inclined member receptacles 136. The inclined member receptacles 136 can be coupled with and extend at a downward angle from the union center 132. In this embodiment, the inclined member receptacles 136 are equally spaced around the perimeter of the union center 132.

As shown in FIG. 3, the upper inclined member receptacles 136 have upper inclined recesses 137 that are configured to mate with the second ends 126 of the inclined members 120. The upper inclined recesses 137 can be sized and shaped such that each inclined member receptacle 136 securely receives the second end 126 of each inclined member 120. In an illustrative embodiment, the inner dimensions of the upper inclined recesses 137 and the outer dimensions of the inclined members 120 are toleranced such that they are securely coupled to each other when the second ends 126 of the inclined members 120 are inserted into the upper inclined member receptacles 136.

Figure 2:
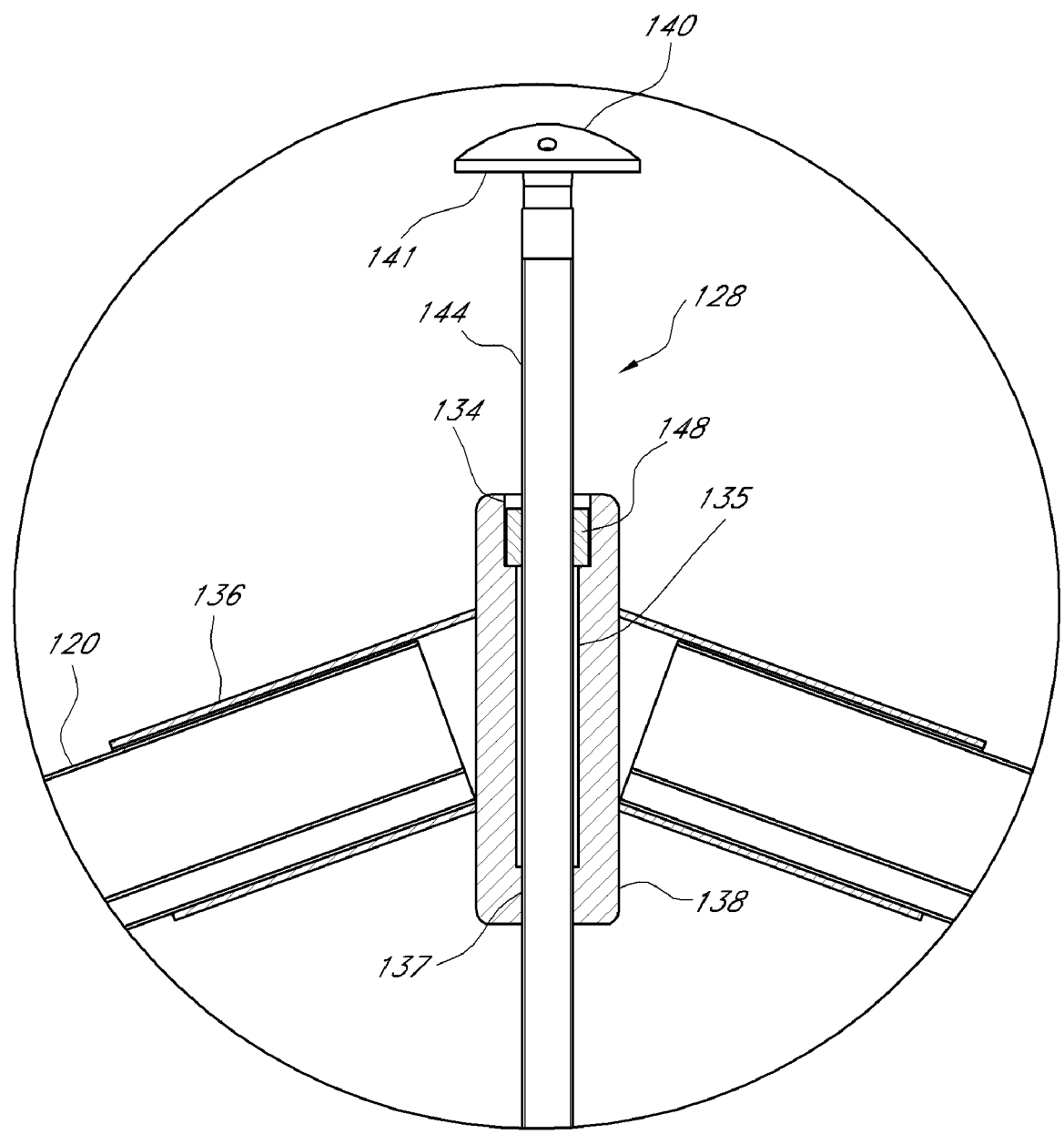
FIG. 2 is a cross-sectional detail view of a top portion of the supporting frame of FIG. 1 taken along the section plane 2-2.

The union center 132 couples the upper union receptacles 136 to each other and supports the cover securement assembly 128. The union center 132 can comprise a generally cylindrical center post 138 having a central hole 133 there through of varying diameter formed along the longitudinal center of the center post 138. The hole 133 can have a first portion 134, second portion 135, and third portion 137. The first portion 134 can be of largest diameter, the second portion 135 can be of smaller diameter than the first portion 134, and the third portion 137 can be of smallest diameter, as shown in FIG. 2. The length of the union center 132 is such that it protrudes above and below the ends of the inclined member receptacles 136 at the interface between the union center 132 and the inclined member receptacles 136.

The cover securement assembly 128 helps secure the cover 101 onto the supporting frame 100. The cover securement assembly 128 can compare an upper cap 140, a center rod 144 with a first end 145 and a second end 146, a bushing 148, and a bottom insert 152, shown in FIG. 1. As shown in FIG. 2, the center rod 144 can be an elongated member of cylindrical shape, and have a diameter approximately equal to the smallest diameter of the union center 132. In one embodiment, the bushing 148 has an outer diameter approximately equal to the largest diameter of the union center 132, an inner diameter approximately equal to the diameter of the center rod 144, and a length less than the length of the first portion 134 of the union center 132. In one embodiment of the invention, the upper cap 140 is coupled to the first end 145 of the center rod 144 and rests against the cover 101 to help secure the cover 101 to the upper frame 112. The upper cap 140 can have a rounded upper surface and a flat bottom surface 141. The upper cap 140 can be sized such that the bottom surface 141 rests against the cover 101 to help secure the cover 101 onto the supporting frame 100. The bottom insert 152 can have an inner diameter that is approximately equal to the diameter of the center rod 144, such that the second end 146 of the center rod 144 can be inserted within the bottom insert 152.

Lower Frame

Figure 4:
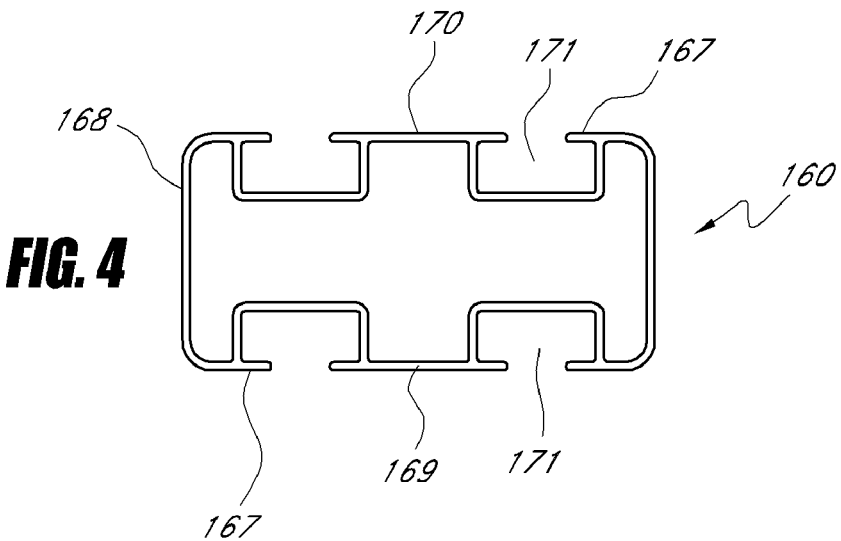
FIG. 4 is a cross-sectional view of a horizontal member for the supporting frame of FIG. 1.
Figure 5:
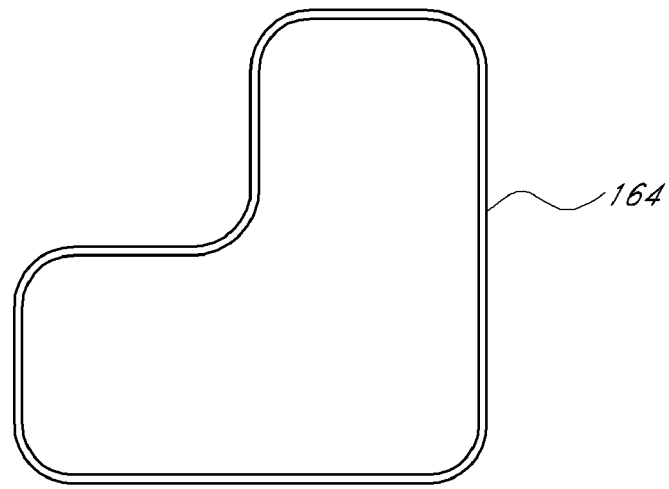
FIG. 5 is a cross-sectional view of a vertical member for supporting frame of FIG. 1.

As shown in FIG. 1 the lower frame 116 comprises corner unions or couplers 176, horizontal elongate members or poles 160, and vertical members 164. The corner couplers 176 connect the upper frame 112 to the lower frame 116. The corner unions 176 also connect the vertical elongate members or poles 164 to the horizontal members 160. In one embodiment, shown in FIG. 4 there are four tubular horizontal members 160 having a bottom surface 168, outer surface 169, and inner surface 170. The horizontal members can have a generally rectangular cross section with two channels 171 formed in each of the outer and inner surfaces 169, 170. As shown in FIG. 4 the channels 171 can be similarly sized and at similar locations on their respective sides with respect to each other. The walls 167 corresponding to the inner and outer surfaces 170, 169 extend partially over the channels 171.

As shown in FIG. 1, four upright or vertical elongate members or poles 164 having a first, upper end 173, second, lower end 174, and bottom surface 175 comprise the lower frame and support the horizontal members. The vertical members 164 can be tubular with a cross-section in the shape of a square with one quadrant removed i.e. generally L-shaped. See FIG. 5. Each vertical or upright member 164 can have a plurality of holes 165 near the first end 173 on each surface that faces another vertical member 164 when the lower frame 116 is assembled. In one embodiment, the holes 165 are oriented as illustrated in FIG. 15. The holes 165 can be located with respect to the first end 173 in a similar location as holes 172 are located relative to each end of the horizontal members 160. The number and quantity of holes 172 and holes 165 can vary, depending on the configuration of corner support 196. In one embodiment, the vertical members 164 include a lock hole 166 located near the second end 174. The diameter of lock hole 166 can be greater than the snap button 220 (described below).

In one embodiment the corner union 176 couples two horizontal members 160, a vertical member 164, and an inclined member 120. In one corner union 176, shown in FIG. 9, two horizontal member inserts 180, one vertical member receptacle 184, and one inclined member receptacle 188 are attached to a corner union base 177. The perimeter of the corner union base 177 can be shaped like a square with one quadrant removed, i.e. generally L-shaped, and be of slightly larger size than the vertical member receptacle 184. In one embodiment, the height of the corner union base 177 is such that it extends slightly above and below the interface between the horizontal member inserts 180 and the inclined member receptacle 188. The horizontal member inserts 180 can extend at right angles to each other from different sides of the corner union base 177 towards different corners of the supporting frame 100. The inclined member receptacle 188 can extend from the internal corner formed by the missing quadrant of the corner union base 176 at an upward angle that is generally the same as that of the inclined member receptacle 136 of the upper union 124. The vertical member receptacle 184 can extend vertically downward from the bottom surface of the corner union base 177.

In one embodiment, the cross section of the horizontal member inserts 180 is shaped generally like an I-beam and sized such that each end of each horizontal member 160 is securely received in a horizontal member insert 180. In an illustrative embodiment, the inner dimensions of the horizontal members 160 and the outer dimensions of the horizontal member inserts 180 are toleranced such that they are securely coupled to each other when a horizontal member insert 180 resides within an end of a horizontal member 160.

The lower inclined member receptacles 188 have tubular lower inclined recesses 189 that are configured to mate with the first ends 125 of the inclined members 120. The lower inclined recesses 189 can be sized and shaped such that each lower inclined member receptacle 136 securely receives the first end 125 of each inclined member 120. In an illustrative embodiment, the inner dimensions of the lower inclined member recesses 189 and the outer dimensions of the inclined members 120 are toleranced such that they are securely coupled when the first end 125 of an inclined member 120 is inserted into a lower inclined member receptacle 188.

In one embodiment, vertical member receptacles 184 have tubular vertical recesses 185 that are configured to mate with the vertical members 164. The vertical recesses 185 can be sized and shaped such that each vertical member receptacle 184 securely receives the first end 173 of a vertical member 164. In an illustrative embodiment, the inner dimensions of the vertical recesses 185 and the outer dimensions of the vertical members 164 are toleranced such that they are securely coupled when the first end 173 of vertical member 164 is inserted into a vertical member receptacle 184.

Assembly of the Pavilion Frame

In one embodiment, each end of each horizontal member 160 is inserted over a horizontal member insert 180 such that the combined horizontal members 160 form a generally square frame. The first end 173 of each vertical member 164 can be inserted into a vertical member receptacle 184, such that the combined horizontal members 160 are lifted above the ground or other mounting surface by the approximate length of vertical or upright members 164. The second end 126 of each inclined member 120 can be inserted into an upper inclined member receptacle 136 and the first end 125 of each inclined member 120 can be inserted into a lower inclined member receptacle 188. See FIG. 1. In one embodiment, at least a part of the cover 101 can be installed over the upper frame 112. The cover securement assembly 128 can help secure the cover by inserting the center rod 144 through the center of upper union 124 such that the bottom surface 141 of the upper cap 140 rests on the cover 101. See FIG. 2.

Reinforcing Components

One embodiment of the invention provides reinforcing components, such as the corner supports 196 and bases 192 illustrated in FIGS. 10 to 27. The number of bases 192 can correspond to the number of vertical members 164 (4 in one embodiment), and the number of corner supports 196 can be installed at each point where a horizontal member 160 is coupled to a vertical member 164 (8 in one embodiment). In alternative embodiments, the bases 192 can be installed on less than all of the vertical members 164, and the corner supports can be installed at less than each point where a horizontal member 160 is coupled to a vertical member 164. Additionally, the corner supports can between any of two members to reinforce the connection and/or the sheltering structure.

Bases

One function of the bases 192 is to stabilize the supporting frame 100 with respect to the surface on which it is mounted. Thus, the invention provides a base, or system, for connecting one or more poles of a structure, such as a pavilion or umbrella, to the ground. The base comprises an upwardly projecting portion having a cross section similar to that of a hollow end of such poles, so that the end of the pole(s) fits over the projection. A wedge mechanism increases in cross-sectional area as the pole travels over the projecting portion, so as to engage and hold the inner surface of the hollow end of the pole. Thus, in one embodiment of the invention, the supporting frame 100 is engaged to the bases 192 by placing the second end 174 of a vertical member 164 over each base 192 such that a portion of a base 192 resides within the vertical member 164. In one embodiment, shown in FIG. 24, each base 192 includes a base plate 200, wedge guide member 204 and, wedges 208.

Figure 24:
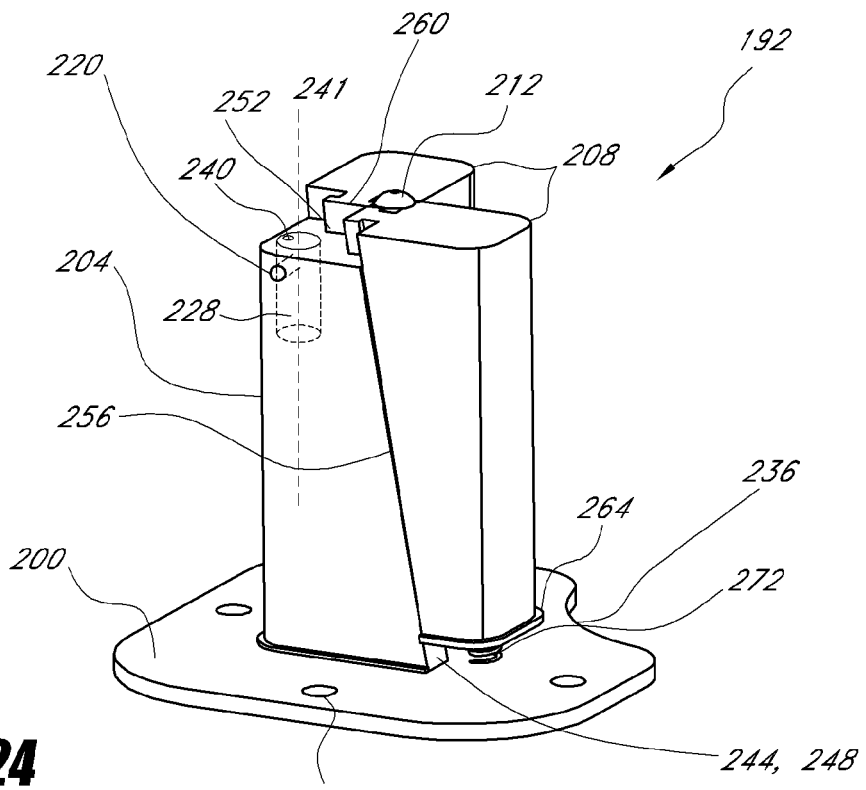
FIG. 24 is a perspective view of one embodiment of a base according to the invention.
Figure 25:
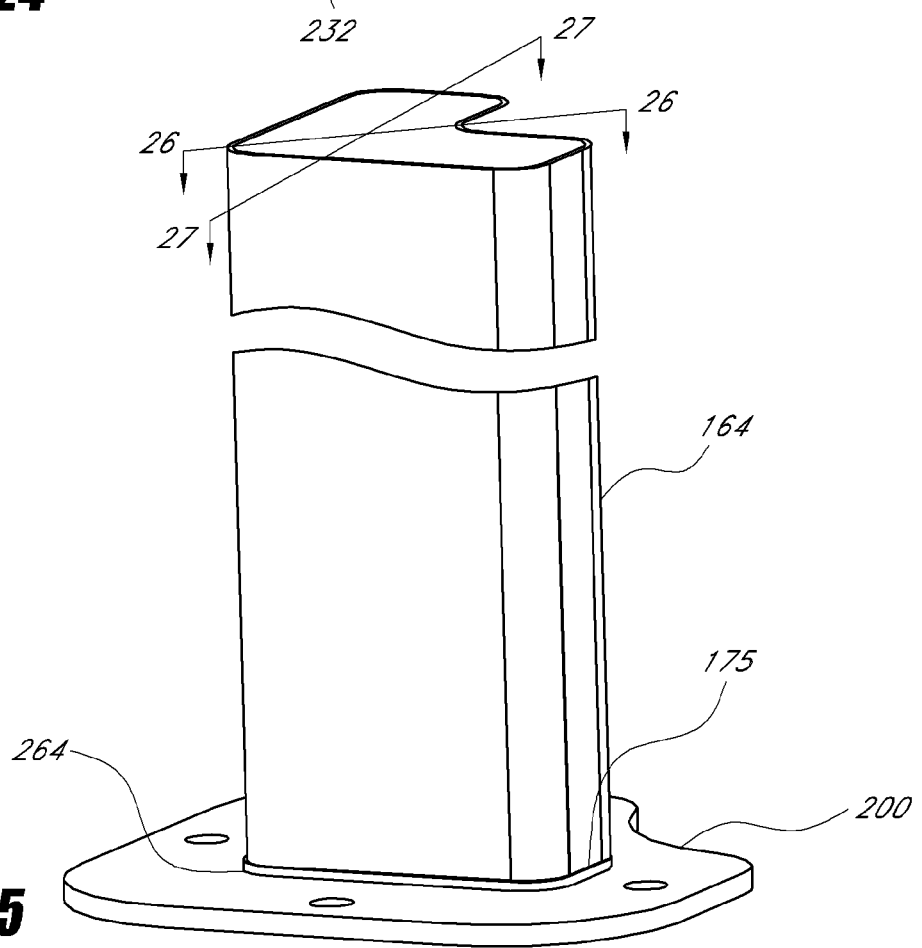
FIG. 25 is a perspective view of the embodiment of the base shown in FIG. 24 with a support pole mounted thereon.
Figure 26:
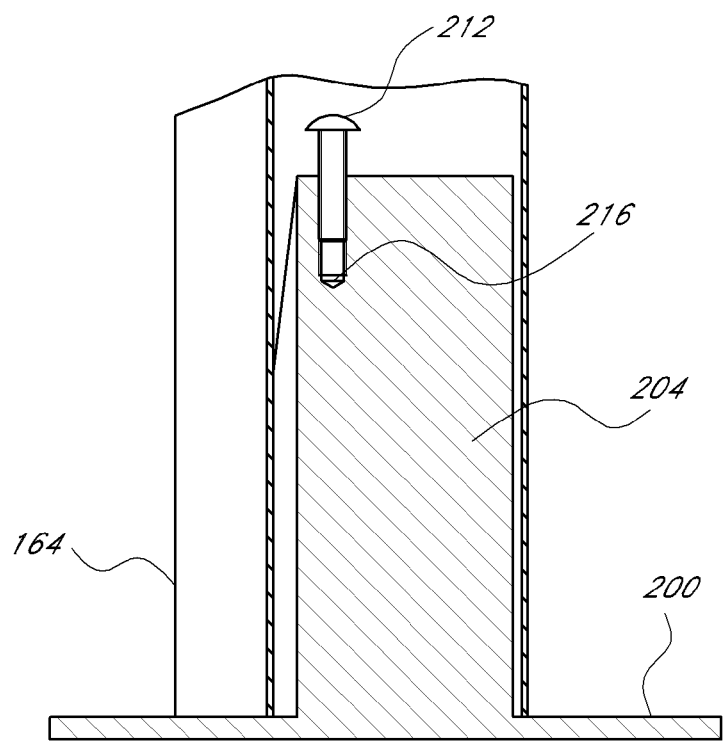
FIG. 26 is a cross-sectional view of the base of FIG. 25 taken along the section plane 26-26.

In one embodiment, the base plate 200 connects the base 192 to the mounting surface and is of sufficient area to enhance the lateral stability of the supporting frame 100. The base plate 200 can be any suitable shape or size sufficient to stabilize the structure. The shape can mimic that of the upright pole it supports. Thus, as illustrated in FIGS. 24 and 25, the base plate 200 can be generally square with 3 rounded corners and a fillet where the 4$^{th}$ corner would be. There can be holes 232 through the base plate 200 that can be used to couple the base plate 200 to a mounting surface, by means of bolts or screws or the like. The base plate 200 can include a cut-out 236 that is shaped and sized similarly to the horizontal cross section of the wedge guide 204. In other embodiments, the base plate 200 may be integrally formed with the wedge guide 204. In further embodiments, the base 192 is not configured with a base plate 200, and any suitable method can be used to provide stability to the support frame 100 relative to the mounting surface. For example, the base 192 can be engaged with the mounting surface by studs extending up from the mounting surface to engage the wedge guide 204. Additionally, the base can provide stability through a lateral plate and does not need to be coupled to the mounting surface, or the weight of the base can provide stability.

In one embodiment of the invention, a wedge guide 204 is provided that guides the movement of the expansion wedges 208 and extends from base plate 200, generally along an axis 241. Typically, axis 241 is perpendicular to base plate 200. The wedge guide 204 and the base plate 200 can be attached to each other by suitable means, such as screws or bolts. In other embodiments, the base plate 200 and the wedge guide 204 can be integrally formed.

The wedge guide can have a generally L-shaped cross-section with two inclined sides 244, 248 that extend downward at an angle from the top of the wedge guide 204, as shown in FIG. 24. Correspondingly, the sides sharing an edge with the inclined walls or surfaces 244, 248 can increase in width as they approach the base plate 200 towards the base plate 200 and angled such that the inclined walls 244, 248 incline away from axis 241 in the direction towards the base plate 200. Thus, the wedge guide 204 has an upper surface with a smaller area than that of its bottom or base. The wedge guide 204 can have a vertical hole 240 drilled into the top of and extending parallel to axis 241 to an intermediate point of wedge guide 204.

In one embodiment of the invention, two expansion wedges 208 move relative to the wedge guide 204 to increase the perimeter of the combined cross section of the wedge guide 204 and wedges 208. In some embodiments, the combined cross section will increase such that the base 192 frictionally engages at least one inner surface of a vertical member 164. The expansion wedges 208 can be of rectangular shape with one inclined side 256 and of height approximately equal to the portion of the wedge guide 204 extending above the base plate 200. The inclined side 256 can be at the supplementary angle to the angle of the inclined sides 244, 248.

The wedge guide member 204 preferably has a groove 252 formed in the face of each inclined wall 244, 248. The grooves 252 can extend along the entire length of the inclined walls 244, 248. In a preferred embodiment, the cross section of each groove 252 is in the shape of the letter "T", as depicted in FIG. 24. The top portion of the "T" can be parallel to the edge formed by the intersection between the top surface of the wedge guide 204 and a respective inclined wall 244, 248 and extend further into the wedge guide 204 than the lower portion of the "T". In alternative embodiments, the groove 252 can be of any other shape that limits relative movement between the wedge guide 204 and the wedges 208. It is also contemplated that the grooves 252 do not extend along the entire length of the inclined walls 244, 248 and that the grooves 252 can be located on a part of the wedge guide other than the inclined walls 244, 248.

The wedge members 208 have a protrusion or rib 260 on their inclined sides 256 that corresponds in cross-section to groove 252 on the wedge guide member 204. Protrusion 260 therefore mates with groove 252 and limits movement of the wedge 208 to along the inclined surfaces of the wedge guide member and the wedges are arranged so that the inclined surface of each wedge slips along the inclined surface(s) of the wedge guide 204. Thus, relative movement between the wedges 208 and the wedge guide 204 is limited. It will be appreciated that the cross-section of the rib 260 and the groove 252 can be varied, but is preferably one that locks the wedge(s) 208 in the wedge guide ember 204.

In some embodiments, a retention hole 216 and retention screw 212 cooperate to prevent the wedges 208 from becoming disassembled from the wedge guide 204. The retention hole 216 (shown in FIG. 26) can extend vertically from the top surface of the wedge guide 204 to an intermediate point thereof. The retention hole 216 can be located near the corner shared by both inclined walls 244, 248. In some embodiments, the retention hole 216 has threads that cooperate with threads in the retention screw 212. The radius of the head of the retention screw 212 can be greater than the distance between the center of the retention hole 216 and the top edges of the inclined walls 244, 248. Thus, the head of retention screw 212 acts against the top of the wedges 208 to prevent them from separating from the wedge guide 204 and to keep them from slipping out of groove 252. In other embodiments, there may be multiple retention screws and retention holes, each located to prevent disassembly of an individual or a plurality of wedge(s) with respect to the wedge guide. In alternative embodiments, disassembly between the wedge guide 204 and wedges 208 can be prevented by other mechanisms.

A locking mechanism may be provided to connect the base 200 to the upright pole 164 when the pole is fitted over the projection from the base 200. Preferably, the mechanism is releasable so that the pole 164 can be easily disengaged from the base 200.

In one embodiment, a button 220 cooperates with lock hole 164 to retain vertical member 184 in a vertical position with respect to a wedge guide 204. As shown in FIG. 24, a hole 228 can extend through and perpendicular to one of the straight walls of the wedge guide 204. The hole 228 can be located at an intermediate point along the height of wedge guide 204 that is nearer the top than the bottom of wedge guide 204. The axis of snap hole 228 can intersect the axis 241 of vertical hole 240.

The button 220 can be cylindrically shaped with a flange (not shown) on one end. The diameter of the flange can be larger than the diameter of the hole 228, and the diameter of the remaining portion of the button 220 is smaller than the diameter of the hole 228 and the lock hole 166.

Figure 28:
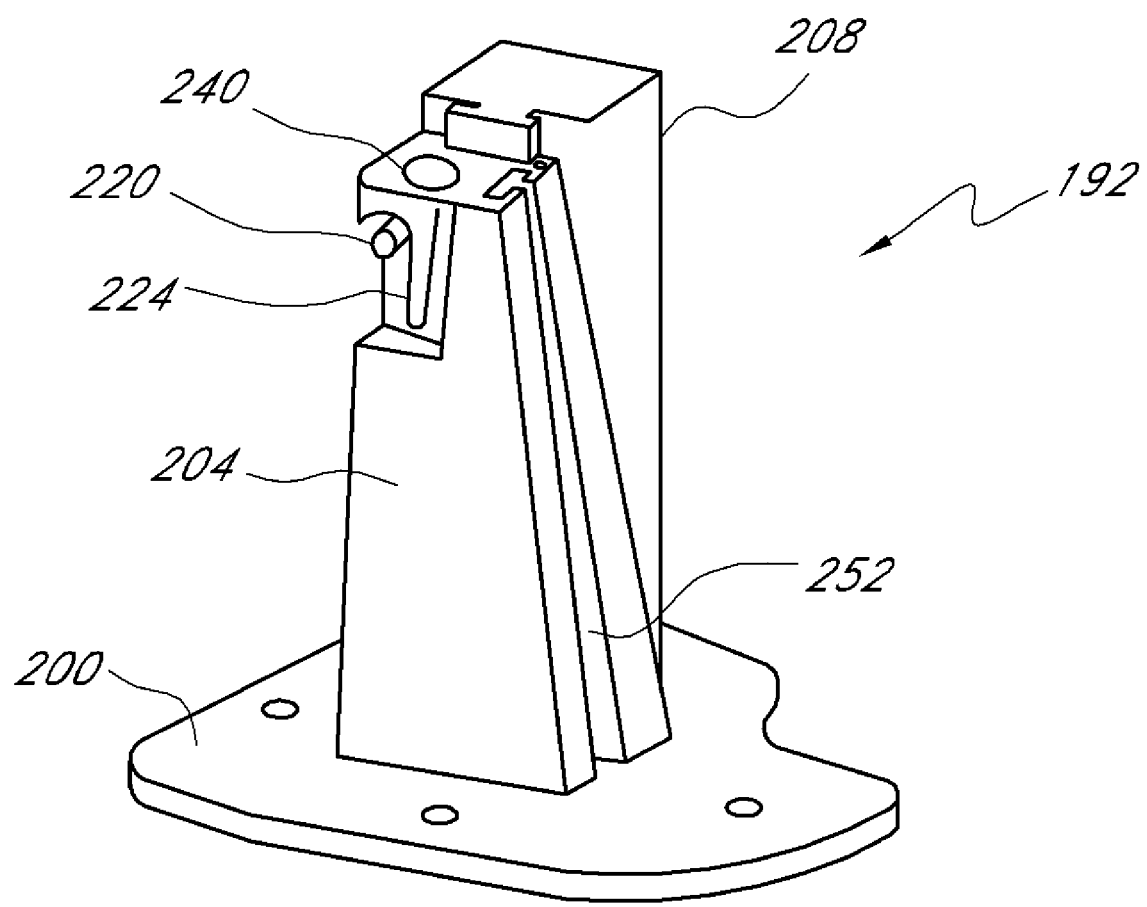
FIG. 28 is a partially broken away view of the base of FIG. 25.

In some embodiments, a spring 224, shown in FIG. 28, allows the button 220 to engage and disengage a vertical member 164 by allowing compression and rebound of button 220. In some embodiments, the spring 224 comprises a metal wire shaped like the letter "U". It can be of circular cross section and sized so that the sides of the "U" are biased against each other when the spring 224 is inserted into the vertical hole 240. In one embodiment, the top portion of one side of the "U" is bent at approximately 90 degrees. In the center of flange 221, there can be a snap spring hole that shares the axis of the button 220 and extends through an intermediate portion of the button 220. The diameter of the spring hole 240 can be sized such that it is larger than the diameter of the spring 224. The end of the spring 224 that is bent can be inserted into the spring hole 240, and the button 220 and the spring 224 can engage base 192 such that the spring 224 biases, the button 220 through the hole 228, and the button flange rests against the interior surface of the vertical hole 240.

At least one wedge 208 and preferably each of them has a flange 264 protruding from an outer wall. The flange is preferably located adjacent the lower end of the wedge, as shown in FIG. 24. The bottom surface 175 of a vertical member 164 contacts flange 264 when a vertical member 164 is placed over a base 192 and thereby induces relative movement between the wedges 208 and the wedge guide 204. See FIG. 27A. The flange 264 can extend parallel to the top surface of the wedge 208 from a bottom portion of each wedge 208. The compression flange 264 can extend from multiple sides of each wedge 208, and the bottom of the wedge 208 and the bottom of the flange 264 can be one continuous surface.

Figure 27:
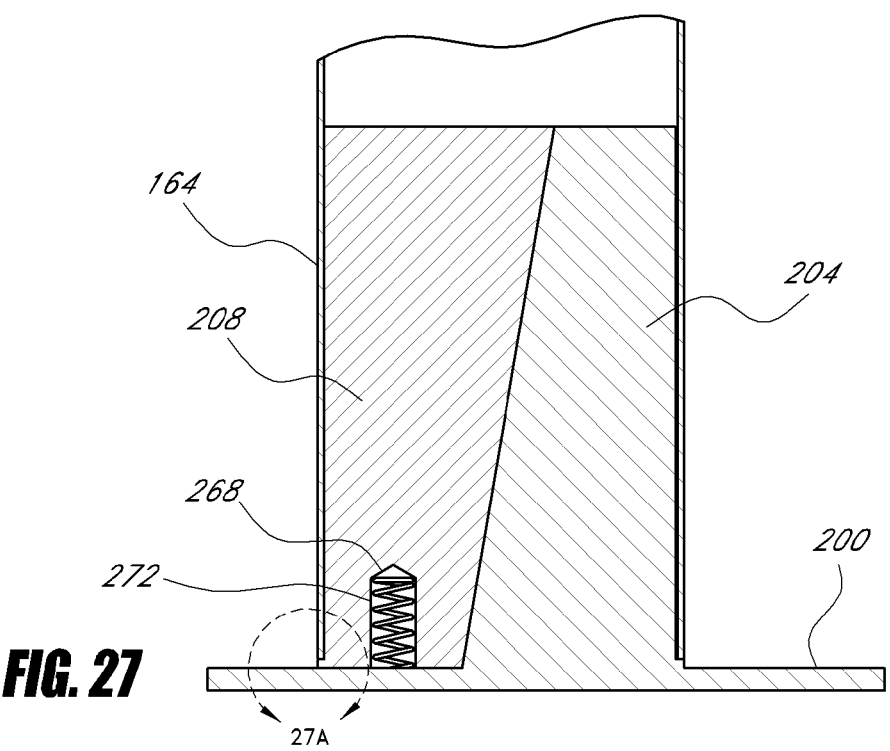
FIG. 27 is a cross-sectional view of the base of FIG. 25 taken along the section plane 27-27.
Figure 27A:
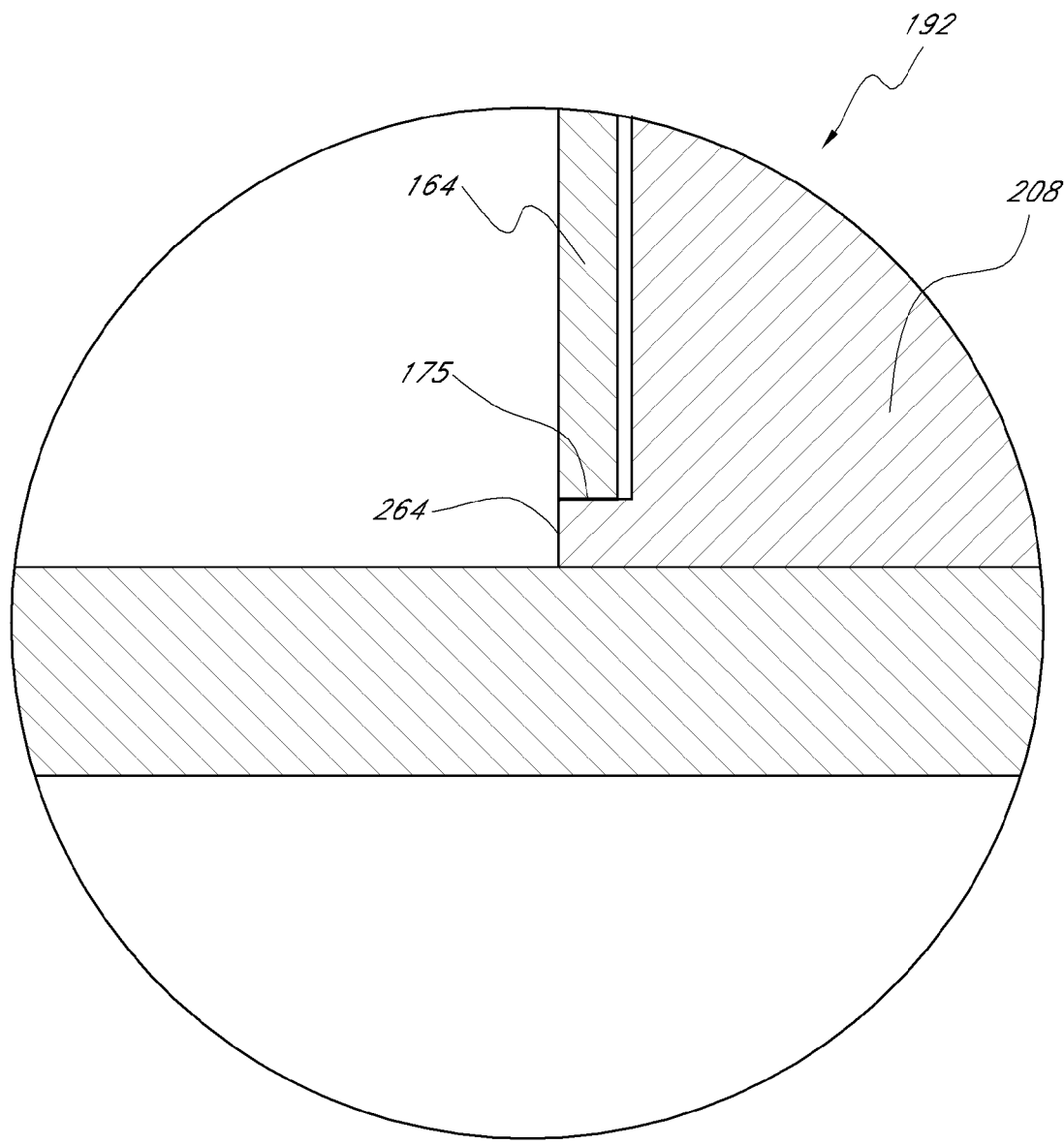
FIG. 27A is detail view of the cross-sectional view of the base of FIG. 27 showing one embodiment of a flange.

In some embodiments, biasing members 272 are located between the base plate 200 and each wedge 208, as shown in FIG. 27. The biasing members 272 bias the wedges 208 upwardly relative to the wedge guide 204 and away from base plate 200 to provide a release force when it is desired to remove the upright member 164 from the base. In some embodiments, the biasing members 272 comprise coil springs that are compressed when a vertical member 164 is placed over a base 192. The compressive force in the biasing member 272 can return the wedges 208 to their elevated position when a vertical member 164 is separated from the base 192. In an illustrative embodiment, the resilient members are helical compression springs, as depicted in FIG. 27. Each compression spring can be located between the base plate and an expansion wedge 208. A portion of each compression spring can reside within the spring hole 268, and the remaining portion can extend beyond past bottom surface of the expansion wedge 208. The spring hole 268 can extend vertically from the bottom surface of the expansion wedge 208 to an intermediate point thereof. The spring hole 268 can be sized to allow a portion of the compression spring 272 to reside within.

Consequently, the wedges 208 have two primary positions: (1) a rest position in which the wedges 208 are spaced away from the base plate 200. This represents a position in which the resilient member is substantially uncompressed and the cross-section of the wedge guide and wedges is reduced; and (2) an activated position in which the wedges 208 are shifted downward towards the base plate. In this position such that the resilient members 272 are compressed and the cross-section of the wedge guide and the wedges combined is increased to engage the interior of the hollow end portion of the upright member(s) 164.

The supporting frame 100 can be combined with the bases 192 by placing a vertical member 164 over each base 192. In preferred embodiments of the invention, a bottom surface 175 of each vertical member 164 contacts a flange 264, which shifts the expansion wedges 208 from the non-expanded to the expanded position, thereby frictionally engaging at least one inner surface of the vertical members 164. The combined cross section of the assembled wedge guide 204 and wedges 208 is greater when in the expanded position than when in the non-expanded position. In some embodiments, the relative movement between the wedge guide 204 and each expansion wedge 208 is in different planes that are substantially perpendicular with respect to each other. In alternative embodiments, the expansion wedges 208 do not frictionally engage the vertical members 164, as it is contemplated that the bases 192 may provide stability by decreasing the clearance between the base 192 and the inner surface of the vertical members 164.

Corner Supports

In some embodiments of the invention, corner supports or braces 196 are installed between a horizontal member 160 and vertical member 164 to provide stability to the supporting frame 100. The corner supports can comprise a handlebar or gripping portion 272, a plurality of coupling ends 276, and a longitudinal axis that is common to the handlebar 272 and the coupling ends 276. In some embodiments, there are two coupling ends 276 that are threadably engaged with each end of the handle bar 272.

In one embodiment, the handlebar 272 is twisted by hand to draw the coupling ends 276 toward each other. The handle bar 272 can be of approximately cylindrical shape. Its diameter can decrease from the center to both ends. See FIG. 13. In some embodiments, the handle bar 272 includes a gripping surface 280 along a center portion of the handle bar's length. The gripping surface 280 can comprise ribs (not shown) or equally spaced flat portions (not shown), and the length of the gripping surface 280 can correspond to the portion the handle bar 272 of greatest diameter. In one embodiment, there is a passageway 284 through the longitudinal center of the handlebar 272. The passageway 284 has end portions 289 of enlarged diameter that extend from the ends of the handle bar 272 inwardly to an intermediate point short of the longitudinal center of the handle bar 272. A portion of the passageway 284 between its center and the end portions 289 is of smaller diameter than the end portions 289. In one embodiment, the portion 290 includes internal threads 288 that extend from the outermost point of the center portion 290 towards the center of the handle bar 272. The internal threads can stop at an intermediate point such that a section of the operating hole 284 remains unthreaded.

In one embodiment, shown in FIG. 13 the coupling ends 276 are of a generally cylindrical shape with an angled face 300 at a first end 293 and a flat face 301 at a second end 294.

Each coupling end 276 comprises a first portion 281 and a second portion 282. The first portion 281 extends from the first end 293 to an intermediate point along the length of coupling end 276. The diameter of the first portion 281 can be approximately equal to the smallest outer diameter of handle bar 272. The second portion 282 can extend from the end of the first portion 281 to the second end 294. The diameter of the second portion 282 can be smaller than the first portion 281. The second portion 282 of the coupling end 276 can include external threads 292 that extend from the second end 294 to an intermediate point along the second portion 282 and that are sized to cooperate with the internal threads 288 of the handle bar 272.

In one embodiment of the invention, the angled face 300 is formed at approximately 45 degrees with respect to axis 273. A retaining groove 304 is formed in and normal to the angled face 300, as shown in FIG. 14. Also normal to the angled face can be a cut-out 308 that is formed deeper into angled face 300 than the retaining groove 304. In some embodiments, the retaining groove 304 extends from an intermediate point on the surface of the angled face 300 through a portion of the edge of the angled face 300 that is nearest the second end 294 of the coupling end 276, as depicted in FIG. 14. The clearance cut-out 308 can extend parallel to and be of greater width and length than the retaining groove 304.

Figure 10:
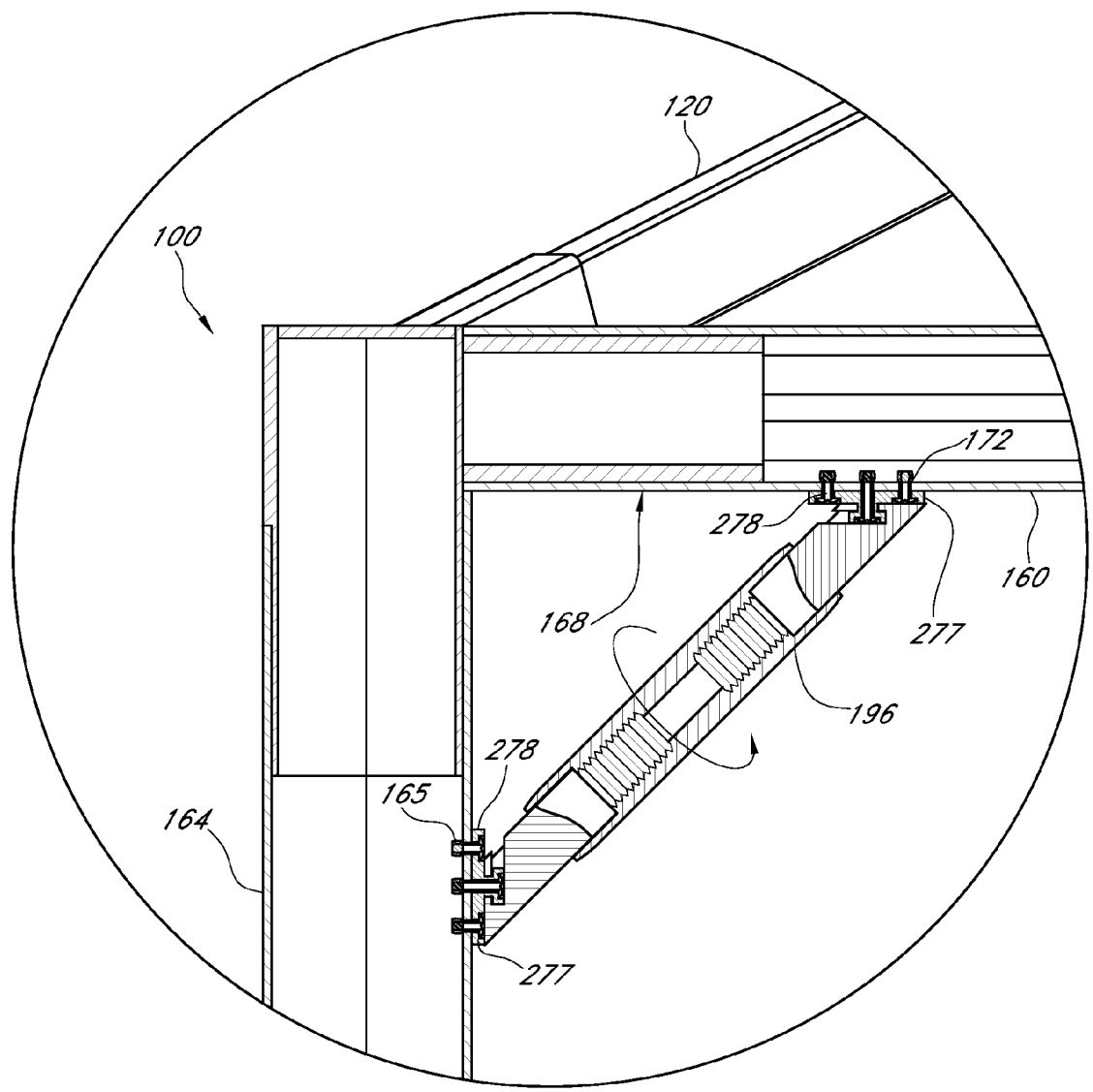
FIG. 10 is a partial cross-sectional view of a corner portion of the supporting frame and showing one embodiment of a corner support.

As shown in FIGS. 10 and 15, mounting plates 277 provide the interface between the corner supports 196 and the supporting frame 100. Each mounting plate 277 can be configured with mounting holes 278 that match the orientation of the holes 172, 165 on the horizontal and vertical members 160, 164. There can be a mounting plate 277 for each location that a coupling end 276 is attached to a horizontal or vertical member 160, 164. The mounting plate 277 can comprise a plate of any desired shape with a protrusion 279 extending there from, such as at its center. The protrusion 279 can comprise a post 285 of a retaining tab 286. The post can have that diameter that is smaller than the width of the retaining groove 304, and the retaining tab can have a diameter that is larger than the width of the retaining groove 304, but less than the width of the clearance cut out 308.

In one embodiment, two mounting plates are attached to each vertical member 164 and each horizontal member 160 by installing screws that extend through the mounting holes 278 and holes 172 and holes 165. In one embodiment, one coupling end 276 of one corner support 196 is coupled to a mounting plate 277 installed on a vertical member 164, and the opposing coupling end 276 of the same corner support 196 is coupled to a mounting plate 277 installed on a horizontal member 160. In some embodiments, the corner supports 196 can be coupled to the mounting plates 277 by sliding coupling slot 296 over the protrusion 279 such that the retaining tab 286 resides within the clearance cut-out 308 and the post 285 resides within the retaining groove 304, as shown in FIG. 10.

An alternative brace according to the invention is shown in FIGS. 16-19.

The brace comprises a gripping portion 400 having first and second ends 401 and 402, respectively. An internal chamber 403 communicates with the ends 401, 402 by means of first and second passageways, 404 and 405, respectively. Passage 404 has a reduced diameter compared with that of chamber 403 to form an annular wall 406 between them. In the embodiment shown in FIG. 18, a recess 407 is formed in the first end 401 of gripping portion 400, which communicates with passage 404.

The brace further comprises first and second connector elements 408 and 409 for attaching the first and second ends to a horizontal member 160 and vertical member 106, respectively. Each connector element comprises an angled face 410 for abutting the horizontal and vertical members 160, 164. A hole 411 extends through each connector element 408, 409, from the angled face(s) 410 to an opposite side 412 of the element(s).

First connector element 408 comprises a portion 413 shaped to fit recess 407 in the first end 401 of gripping portion 400. Portion 413 preferably has a threaded hole 414 extending into a surface thereof which aligns with passage 404 of the gripping portion 400 when portion 413 is fitted into recess 407.

Second connector element 409 has a substantially cylindrical portion 415 extending therefrom. Portion 415 has external threads 416 that mate with internal threads 417 in passageway 405, as shown in FIG. 17, thereby connecting second connection element 409 to the second end 402 of gripping portion 400.

The first end 401 of gripping portion 400 is connected to the first connector element 408 by means of a bolt 418, or similar device. Bolt 418 comprises a shaft 419 having a thread portion 420 at one end an a head 421 at the other end. Bolt 418 is placed in passage 404 of gripping portion 400, with the head abutting wall 406 and the threaded end 420 engaged with the threaded hole 414 of the first connector element 408, as shown in FIG. 17.

Keyholes 422 are formed through the walls of vertical and horizontal members 164, 160, or through plates attached to such members, at appropriate places to mount the brace there between. Keyholes 422 comprise a larger hole 423 communicating with a smaller hole 424. The first and second connectors 408 and 409 are attached to the horizontal and vertical members 160, 164 by means of a screw 425 and nut 426 arrangement that extends trough each of the holes 411 in connector elements 408, 409. Each nut 426 comprises a head portion 427 and a neck portion 428 of smaller diameter. The size of the nut is chosen so that the head 427 will pass through the larger hole 423 of keyhole 422, but not the smaller hole 424. The size of neck 428 is chosen to fit through smaller hole 424 in keyhole 422.

Figure 16:
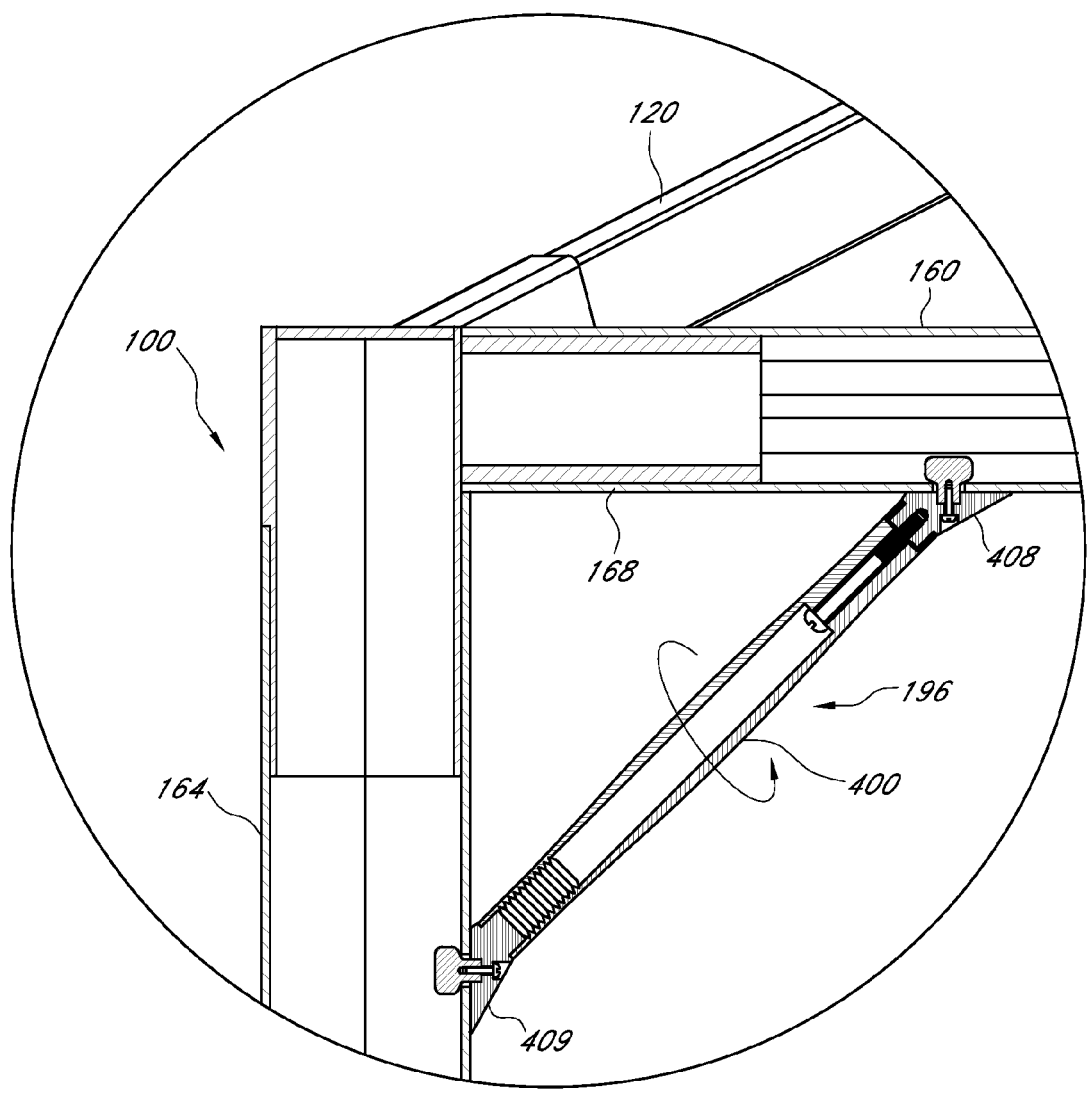
FIG. 16 is a partial cross-sectional view of another corner support of the invention.

Thus, as shown in FIG. 16, brace 196 can be connected to horizontal and vertical members 160, 164 by means of the resistance of nut head 427, located inside these members, to being pulled through the small holes 424 in keyholes 422. Each connector element 408, 409 may be securely tightened to horizontal and vertical members by means of screws 425.

In use, handlebar 272 is grasped and rotated or twisted about its longitudinal axis. In so doing, handle or center portion rotates about the threads 292 on each of the coupling ends 276, thereby drawing the coupling ends 276 towards one another and thereby tightening the upright and horizontal members 164, 160 and provides rigidity and stability to the frame 100.

Another brace according to invention is shown in FIGS. 20 to 23.

As shown in FIG. 22, the brace 16 comprises an elongate member 500 having a longitudinal axis and first and second ends, 501 and 502, respectively. The first end 501 is angled with respect to the longitudinal axis and formed with a flange 503. Second end 502 has threads 504 which receive a nut 505. A collar or sleeve 506 is advanceable over second end 503 by means of rotation of nut 505. Collar 506 has an angled face 507 at one end.

Figure 20:
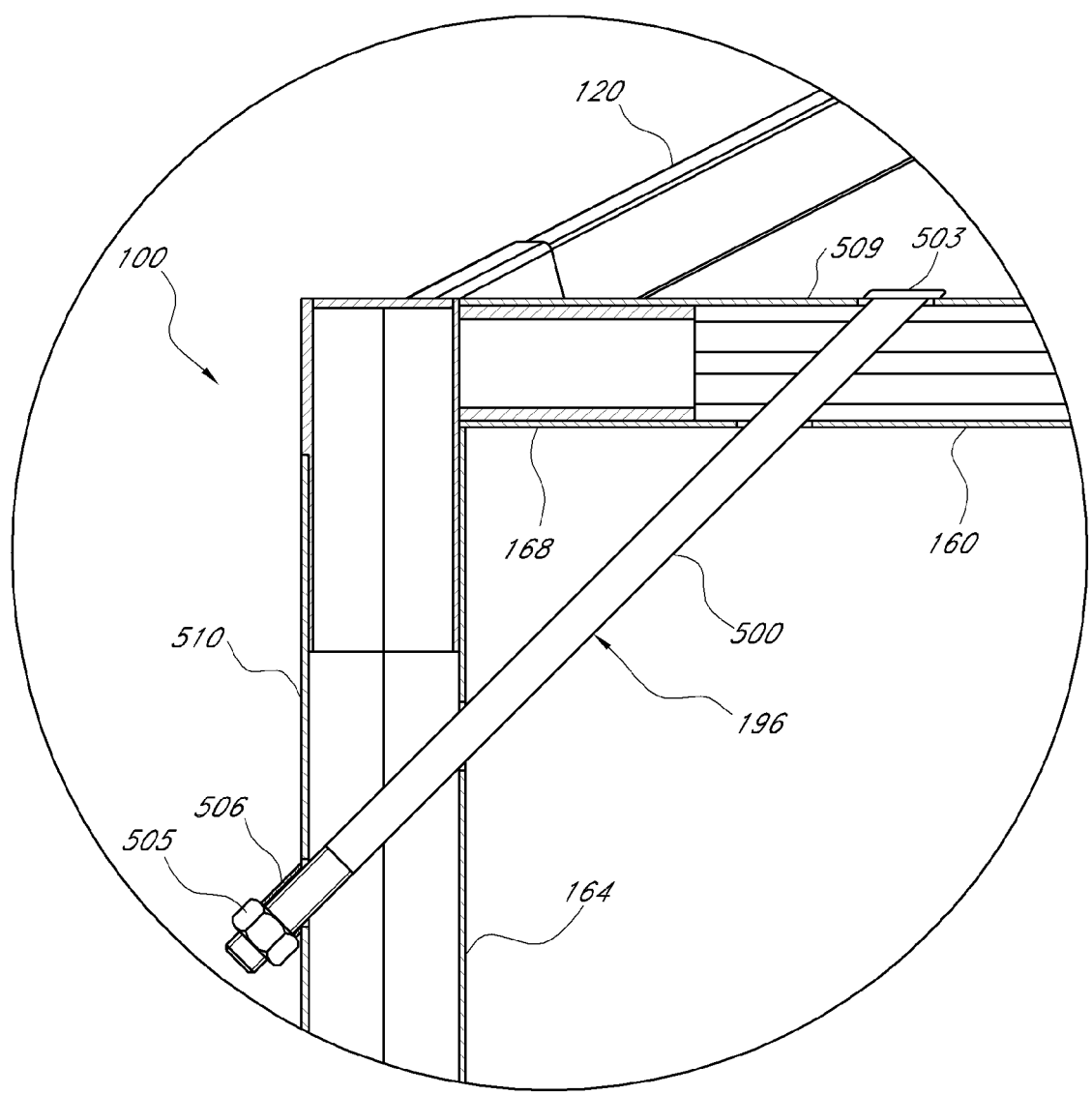
FIG. 20 is a partial cross-sectional view of another corner support of the invention.

In use, brace 196 extends through holes 508 (shown in FIG. 23) formed through upright and horizontal members 164 and 160. Thus, as shown in FIG. 20, member 500 passes, through both the upright and horizontal members 164, 160, with flange 503 engaging an upper surface 509 of horizontal member 160 and the angled face 507 of collar 506 engaging an outer surface 570 of upright member 164. As the nut 505 is tightened, angled face 507 is driven against the upright member 164 and the flange 503 is drawn against the horizontal member 160, thereby tightening the brace and the horizontal and upright members together.

What is claimed is:

1. A pavilion assembly comprising:
   a plurality of upright elongate members;
   a plurality of elongate members arranged at an angle to the upright members;
   at least one of the upright members being connected to at least one of the angled members by at least one brace, the brace having first and second ends and a longitudinal axis and comprising:
   a first connector element, attaching the first end of the brace, directly or indirectly, to the at least one upright member;
   a second connector element, attaching the second end of the brace, directly or indirectly, to the at least one angled member;
   a handle portion, located between the first and second connector element and being rotatable with respect to said connector elements about said longitudinal axis, the handle portion and connector elements extending generally along that axis;
   the first and second connector elements having outer walls and a surface facing the upright member and angled member, respectively, and sloping with respect to said axis;
   said sloping surfaces each having a first slot extending from an outer wall along the sloping surface, and being open through said outer wall and along at least part of its length along said surface, and a second slot extending generally parallel to the first and below it from the outer wall and being open to said outer wall and to said first slot along at least a part of the length of the first slot, said slots receiving attachment members attached directly or indirectly to the at least one upright member and the at least one angled member;
   whereby rotation of the handle portion in one direction draws the connector portions together, and thereby also the at least one upright member and the at least one angled member, and rotation of the handle portion in the other direction allows the connector portions to move further apart.

2. The pavilion assembly of claim 1, wherein the first connector element is releasably coupled by sliding engagement, directly or indirectly, to the at least one upright member.

3. The pavilion assembly of claim 1, wherein the second connector element is releasably coupled by sliding engagement, directly or indirectly, to the at least one angled member.

4. A brace for a shade structure comprising:
   a first end, a second end, and a longitudinal axis extending therebetween;
   a first connector element, adapted to attach the first end of the brace, directly or indirectly, to a structural member of a shade structure;
   a second connector element, adapted to attach the second end of the brace, directly or indirectly, to a structural member of a shade structure;
   a handle portion, located between the first and second connector elements and being rotatable with respect to said connector elements about said longitudinal axis, the handle portion and connector elements extending generally along that axis;
   whereby rotation of the handle portion in one direction draws the connector elements together, and thereby also draws members of a shade structure together, and rotation of the handle portion in another direction allows the connector elements to move further apart;
   wherein the first and second connector elements comprise outer walls and a surface facing generally away from the handle portion, said surface having a first slot extending from an outer wall along the surface, and being open through said outer wall and along at least part of its length along said surface, and a second slot extending generally parallel to the first and distanced further away from the sloping surface than the first slot and being open to said outer wall and to said first slot along at least a part of the length of the first slot, said slots configured to receive a portion of a structural member of a shade structure.

5. A brace for a shade structure comprising:
   a first end, a second end, and a longitudinal axis extending therebetween;
   a first connector element, adapted to attach the first end of the brace, directly or indirectly, to a structural member of a shade structure;
   a second connector element, adapted to attach the second end of the brace, directly or indirectly, to a second structural member of the shade structure;
   at least one of the first and second connector elements adapted to be releasably coupled, directly or indirectly, to the respective structural member of the shade structure by sliding engagement;
   a handle portion, located between the first and second connector elements and being rotatable with respect to said connector elements about said longitudinal axis, the handle portion and connector elements extending generally along said longitudinal axis;
   first external threads on the first connector element;
   first internal threads disposed on a first end of the handle portion, the first internal threads being complementary to the first external threads;
   second external threads on the second connector element that are wound in a direction opposite to a direction of the first external threads; and
   second internal threads disposed on a second end of the handle portion, the second internal threads being complementary to the second external threads;
   wherein rotation of the handle portion in one direction tightens the first external threads to the first internal threads and tightens the second external threads to the second internal threads to draw the connector elements together, and rotation of the handle portion in the opposite direction loosens the first external threads from the first internal threads and loosens the second external threads from the second internal threads to move the connector elements apart.

6. The brace of claim 5, wherein the handle portion comprises a roughened surface.

7. The brace of claim 5, wherein the handle portion comprises at least one flat portion on an outer surface.

8. The brace of claim 5, further comprising at least one mounting adapter that interconnects at least one of the first and the second connector elements with at least one member of the shade structure.

9. A brace for a shade structure comprising:
   a first end, a second end, and a longitudinal axis extending therebetween;

a first connector element, adapted to attach the first end of the brace, directly or indirectly, to a structural member of a shade structure;

a second connector element, adapted to attach the second end of the brace, directly or indirectly, to a second structural member of the shade structure;

at least one of the first and second connector elements adapted to be releasably coupled, directly or indirectly, to the respective structural member of the shade structure by sliding engagement;

a handle portion, located between the first and second connector elements and being rotatable with respect to said connector elements about said longitudinal axis, the handle portion and connector elements extending generally along said longitudinal axis;

external threads on the first connector element;

internal threads disposed on an end of the handle portion, the internal threads being complementary to the external threads; and a coupling between the second connector element and the handle portion that allows for rotational movement but not axial movement of the second connector element relative to the handle portion;

wherein rotation of the handle portion in one direction tightens the external threads to the internal threads to draw the connector elements together, and rotation of the handle portion in the opposite direction loosens the external threads from the internal threads to move the connector elements apart.

10. A shade structure comprising:

a pavilion assembly comprising a first member and a second member arranged at an angle to the first member;

a brace comprising:

a first end, a second end, and a longitudinal axis extending therebetween;

a first connector element, adapted to attach the first end of the brace, directly or indirectly, to the first member;

a second connector element, adapted to attach the second end of the brace, directly or indirectly, to the second member; and a slideably engageable connection disposed between the brace and at least one of the members of the pavilion assembly comprising:

a protrusion comprising a head portion, and a neck portion having a smaller width than the head portion;

a first opening having a width greater than a width of the head portion to permit insertion of the head portion therein and a second opening having a smaller width than that of the first opening and than that of the head portion;

wherein the neck portion is configured to fit through the second opening;

a handle portion located between the first and second connector elements and being rotatable with respect to said connector elements about said longitudinal axis, the handle portion and connector elements extending generally along said longitudinal axis;

whereby rotation of the handle portion in one direction draws the connector elements together and causes the neck portion to slide in the second opening to provide additional support for the first and second members of the pavilion assembly.

11. The shade structure of claim 10, further comprising:

first external threads on the first connector element;

first internal threads disposed on a first end of the handle portion, the first internal threads being complementary to the first external threads;

second external threads on the second connector element that are wound in a direction opposite to a direction of the first external threads; and second internal threads disposed on a second end of the handle portion, the second internal threads being complementary to the second external threads;

wherein rotation of the handle portion in one direction tightens the first external threads to the first internal threads and tightens the second external threads to the second internal threads to draw the connector elements together, and rotation of the handle portion in the other direction loosens the first external threads from the first internal threads and loosens the second external threads from the second internal threads to move the connector elements further apart.

12. The shade structure of claim 10, further comprising external threads on the first connector element;

internal threads disposed on an end of the handle portion, the internal threads being complementary to the external threads; and a coupling between the second connector element and the handle portion that allows for rotational movement but not axial movement of the second connector element relative to the handle portion;

wherein rotation of the handle portion in one direction tightens the external threads to the internal threads to draw the connector elements together, and rotation of the handle portion in the other direction loosens the external threads from the internal threads to move the connector elements apart.

13. The shade structure of claim 10, wherein the handle portion comprises a roughened surface.

14. The shade structure of claim 10, wherein the handle portion comprises at least one flat portion on an outer surface.

15. The shade structure of claim 10, further comprising at least one mounting adapter that interconnects at least one of the first and the second connector elements with at least one of the members of the shade structure.

* * * * *

UNITED STATES PATENT AND TRADEMARK OFFICE
CERTIFICATE OF CORRECTION

PATENT NO. : 8,025,071 B2
APPLICATION NO. : 12/633705
DATED : September 27, 2011
INVENTOR(S) : Oliver Joen-an Ma It is certified that error appears in the above-identified patent and that said Letters Patent is hereby corrected as shown below:

At column 4, line 31, please change "configuration;" to --configuration.--.

At column 6, line 22, please change "hays" to --has--.

At column 8, line 25, please change "squire," to --square,--.

At column 8, line 26, please change "polygen" to --polygon--.

At column 15, line 35, please change "there from," to --therefrom,--.

At column 16, line 21, please change "an" to --and--.

At column 16, line 33, please change "trough" to --through--.

Signed and Sealed this
Fifth Day of June, 2012

David J. Kappos
*Director of the United States Patent and Trademark Office*